United States Patent
Ohara et al.

(10) Patent No.: US 12,434,419 B2
(45) Date of Patent: Oct. 7, 2025

(54) ABNORMALITY DETECTION DEVICE FOR EXTRUSION MOLDING MACHINE

(71) Applicants: Shibaura Machine Co., Ltd., Chiyoda-ku (JP); NATIONAL UNIVERSITY CORPORATION KANAZAWA UNIVERSITY, Kanazawa (JP)

(72) Inventors: Masatoshi Ohara, Numazu (JP); Kentaro Taki, Kanazawa (JP); Tsukasa Kida, Kanazawa (JP)

(73) Assignees: Shibaura Machine Co., Ltd., Chiyoda-ku (JP); NATIONAL UNIVERSITY CORPORATION KANAZAWA UNIVERSITY, Kanazawa (JP)

( * ) Notice: Subject to any disclaimer, the term of this patent is extended or adjusted under 35 U.S.C. 154(b) by 490 days.

(21) Appl. No.: 17/618,946

(22) PCT Filed: May 25, 2020

(86) PCT No.: PCT/JP2020/020591
§ 371 (c)(1),
(2) Date: Dec. 14, 2021

(87) PCT Pub. No.: WO2021/002119
PCT Pub. Date: Jan. 7, 2021

(65) Prior Publication Data
US 2022/0242031 A1    Aug. 4, 2022

(30) Foreign Application Priority Data
Jul. 2, 2019    (JP) .................................. 2019-123414

(51) Int. Cl.
B29C 48/92    (2019.01)
G01M 99/00    (2011.01)
B29C 48/40    (2019.01)

(52) U.S. Cl.
CPC ............ *B29C 48/92* (2019.02); *G01M 99/005* (2013.01); *B29C 48/40* (2019.02); *B29C 2948/92295* (2019.02); *B29C 2948/92361* (2019.02)

(58) Field of Classification Search
CPC ....... B29C 48/92; B29C 48/40; B29C 48/405; B29C 48/402; B29C 2948/92361;
(Continued)

(56) References Cited

U.S. PATENT DOCUMENTS

| 5,324,107 A | 6/1994 | Tanaka et al. |
| 2009/0042483 A1* | 2/2009 | Meki ...................... B23Q 17/22 451/11 |

(Continued)

FOREIGN PATENT DOCUMENTS

| CN | 102729446 A | 10/2012 |
| EP | 1 881 297 A2 | 1/2008 |

(Continued)

OTHER PUBLICATIONS

Machine Translation of Chikara (JPH08216230A) (Year: 1996).*
(Continued)

*Primary Examiner* — Stephen D Meier
*Assistant Examiner* — Quang X Nguyen
(74) *Attorney, Agent, or Firm* — Oblon, McClelland, Maier & Neustadt, L.L.P.

(57) ABSTRACT

A signal acquisition unit of an abnormality detection device for a twin-screw extrusion molding machine, when the twin-screw extrusion molding machine that melts and kneads a fed resin raw material is in operation, acquires an (Continued)

AE output of an AE sensor installed on a surface of a housing of the twin-screw extrusion molding machine. A determination unit determines whether an abnormality occurs in the twin-screw extrusion molding machine, based on a relationship between the AE output and a first threshold and a second threshold.

4 Claims, 21 Drawing Sheets

(58) Field of Classification Search
CPC . B29C 2948/92295; B29C 2948/9279; G01M 99/005
See application file for complete search history.

(56) References Cited

U.S. PATENT DOCUMENTS

| | | |
|---|---|---|
| 2017/0036261 A1 | 2/2017 | Iwakuro et al. |
| 2017/0259484 A1* | 9/2017 | Tabuse ................... G01N 29/14 |
| 2019/0152119 A1 | 5/2019 | Norlund et al. |
| 2019/0184590 A1 | 6/2019 | Takahashi et al. |

FOREIGN PATENT DOCUMENTS

| | | | | |
|---|---|---|---|---|
| JP | 63-139705 A | | 6/1988 | |
| JP | 2-137908 A | | 5/1990 | |
| JP | 4-32737 A | | 2/1992 | |
| JP | 6-170920 A | | 6/1994 | |
| JP | 6-331673 A | | 12/1994 | |
| JP | 8-216230 A | | 8/1996 | |
| JP | 2005-47091 A | | 2/2005 | |
| JP | 2007-152427 A | | 6/2007 | |
| JP | 2012111091 A | * | 6/2012 | |
| JP | 2013-203070 A | | 10/2013 | |
| JP | 5302436 B1 | | 10/2013 | |
| JP | 2015-115540 A | | 6/2015 | |
| KR | 2016110722 A | * | 9/2016 | ............... G01H 5/00 |
| WO | WO 2017/212881 A1 | | 12/2017 | |
| WO | WO 2019/110194 A1 | | 6/2019 | |

OTHER PUBLICATIONS

Machine Translation of Asai (JP 2015115540A) (Year: 2015).*
International Search Report issued on Jul. 14, 2020 in PCT/JP2020/020591 filed on May 25, 2020, 3 pages.
Combined Chinese Office Action and Search Report issued Mar. 14, 2023, in corresponding Chinese Patent Application No. 202080046495.5 (with English Translation and English Translation of Category of Cited Documents), 19 pages.

* cited by examiner

A-A

B-B

ABNORMALITY DETECTION DEVICE FOR EXTRUSION MOLDING MACHINE

CROSS-REFERENCE TO RELATED APPLICATIONS

This application is a national stage application of International Application No. PCT/JP2020/020591, filed May 25, 2020, which designates the United States, incorporated herein by reference, and which claims the benefit of priority from Japanese Patent Application No. 2019-123414, filed Jul. 2, 2019, the entire contents of which are incorporated herein by reference.

TECHNICAL FIELD

The present invention relates to an abnormality detection device for an extrusion molding machine.

BACKGROUND ART

A phenomenon is known in which strain energy accumulated so far is emitted as a sound wave (an AE wave) when a solid material is deformed. Conventionally, there is known a material monitoring device for an injection molding machine that detects an abnormality in the molten state of a material by detecting an AE wave with an AE sensor and analyzing the waveform of the AE wave.

For example, the material monitoring device for an injection molding machine described in Patent Literature 1 detects an AE wave generated when an unmelted resin raw material is deformed or sheared by analyzing an output of an AE sensor.

CITATION LIST

Patent Literature

Patent Literature 1: JP 2012-111091 A

SUMMARY OF INVENTION

Problem to be Solved by the Invention

Conventionally, there has been no technology for detecting an abnormality of an extrusion molding machine using an AE sensor.

The present invention has been made in view of the above, and an object thereof is to provide an abnormality detection device for an extrusion molding machine capable of reliably detecting an abnormality of the extrusion molding machine.

Effect of the Invention

The abnormality detection device for an extrusion molding machine according to the present invention can reliably detect an abnormality of the extrusion molding machine.

DESCRIPTION OF EMBODIMENTS

[Description of Acoustic Emission (AE)]

Before the description of embodiments, acoustic emission (hereinafter, referred to as "AE") used for determining whether an abnormality occurs in an extrusion molding machine in operation will be described. AE is a phenomenon in which strain energy accumulated so far is emitted as a sound wave (an elastic wave, an AE wave) when a solid material is deformed. An abnormality of the solid material can be predicted by detecting the AE wave. The frequency band of the AE wave is said to be about several tens kHz to several MHz, and has a frequency band that cannot be detected by a general vibration sensor or acceleration sensor. Consequently, a dedicated AE sensor is used to detect the AE wave. The AE sensor will be described later in detail.

Figure 1:
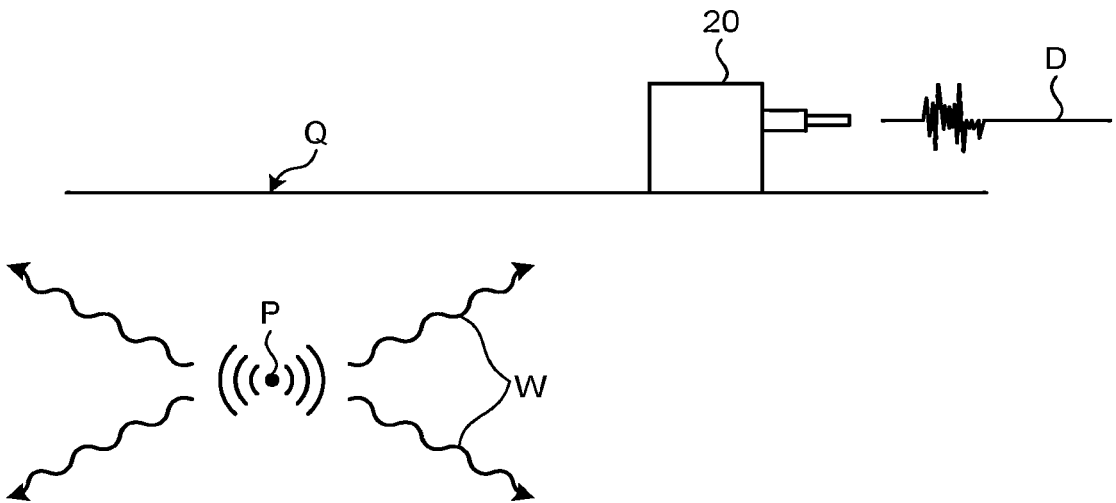
FIG. 1 is an explanatory diagram of acoustic emission.

FIG. 1 is an explanatory diagram of acoustic emission and an AE sensor. As illustrated in FIG. 1, when deformation, contact, friction, or the like occurs at a point P inside a solid material Q, AE waves W are generated. The AE wave W spreads radially from the point P and propagates inside the solid material Q at a speed based on the solid material Q.

The AE wave W propagating inside the solid material Q is detected by an AE sensor 20 installed on the surface of the solid material Q. The AE sensor 20 then outputs a detection signal D. Since the detection signal D is a signal representing vibration, the detection signal D is an AC signal with positive and negative values as illustrated in FIG. 1. However, in this state, it is difficult to use the detection signal D (the AE wave W) when performing various calculations, and thus, it is common to use a rectified waveform obtained by performing half-wave rectification on the negative portion of the detection signal D. Furthermore, when the AE wave W is analyzed, in general, a value obtained by averaging the square value of the rectified waveform over a predetermined time and taking its square root, that is, an effective value (a root mean square (RMS) value) is used.

The propagation speed of the AE wave W is different between a longitudinal wave and a lateral wave (the longitudinal wave is faster than the lateral wave). However, in consideration of the size (the propagation distance) of the solid material Q, the difference can be ignored. Consequently, in the present embodiment, the AE wave W detected within a predetermined time is analyzed as a measurement signal without any distinction between the longitudinal wave and the lateral wave.

Figure 2:
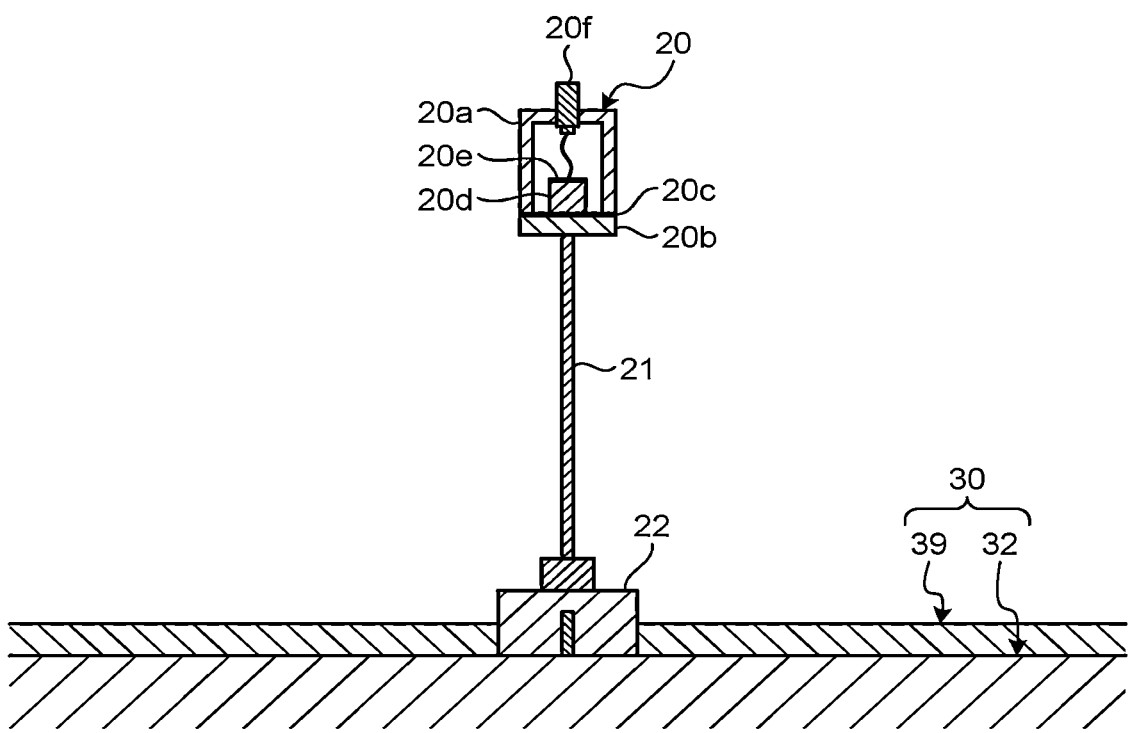
FIG. 2 is a schematic structural diagram of an AE sensor.

FIG. 2 is a schematic structural diagram of an AE sensor. As illustrated in FIG. 2, the AE sensor 20 is installed at the distal end of a waveguide rod 21 (a waveguide) installed in contact with the surface of a housing (barrel) 32 of a twin-screw extrusion molding machine 30 to be detected in a state of being enclosed in a shield case 20a. The waveguide rod 21 is made of ceramic or stainless steel, and transmits the AE wave W transmitted inside the housing 32 to the AE sensor 20.

The waveguide rod 21 is used because a heater 39 for melting a resin raw material is mounted on the surface of the housing 32 of the twin-screw extrusion molding machine 30 and a high temperature of about 200° C. is obtained, and thus the AE sensor 20 cannot be directly installed on the housing 32. Note that a magnet 22 is installed at the distal end of the waveguide rod 21, and the waveguide rod 21 is fixed on the surface of the housing 32 of twin-screw extrusion molding machine 30 by the magnet 22 so as to avoid the position of the heater 39. Alternatively, the distal end of the waveguide rod 21 may be fixed on the surface of the housing 32 by screwing.

The other end side of the waveguide rod 21 is connected to a wave receiving surface 20b of the AE sensor 20. A vapor deposited film 20c made of copper or the like is formed on the wave receiving surface 20b. A piezoelectric element 20d made of lead zirconate titanate (PZT) or the like is disposed on the vapor deposited film 20c. The piezoelectric element 20d receives the AE wave W transmitted inside the waveguide rod 21 via the wave receiving surface 20b, and outputs an electric signal corresponding to the AE wave W. The electrical signal output from the piezoelectric element 20d is output as the detection signal D via a vapor deposited film 20e and a connector 20f. Note that since the detection signal D is weak, in order to suppress the influence of noise mixture, a preamplifier (not illustrated in FIG. 2) may be installed inside the AE sensor 20, and the detection signal D may be amplified in advance and then output.

Since AE is also generated by fine scratches and friction, a sign of an abnormality in a device can be found early. In addition, as illustrated in FIG. 1, since the AE wave W radially spreads from the point P, it is possible to observe the AE wave W and acquire the detection signal D at any position of the housing by installing the AE sensor 20 as long as the housing is made of metal. Note that a specific analysis method of the detection signal D will be described later. In addition, since the frequency band of a signal that can be detected varies depending on the type of the AE sensor 20, it is desirable to consider the material or the like of the twin-screw extrusion molding machine 30 to be detected when selecting the AE sensor 20 to be used.

Hereinafter, embodiments of an abnormality detection device for an extrusion molding machine according to the present disclosure will be described in detail with reference to the drawings. Note that the present invention is not limited by these embodiments. In addition, constituent elements in the following embodiments include those that can be replaced by those skilled in the art and can be easily conceived, or those that are substantially the same.

First Embodiment

A first embodiment of the present disclosure is an example of an abnormality detection device for a twin-screw extrusion molding machine that detects and notifies the occurrence of an abnormality during operation. In particular, in the first embodiment, the occurrence of an abnormality in the twin-screw extrusion molding machine 30 is detected by one AE sensor 20 installed on the surface of the housing 32 of the twin-screw extrusion molding machine 30. Note that the twin-screw extrusion molding machine is an example, and the present disclosure is applicable to all extrusion molding machines such as a single-screw extrusion molding machine or a multi-screw extrusion molding machine.

[Description of Schematic Structure of Twin-Screw Extrusion Molding Machine]

Figure 3:
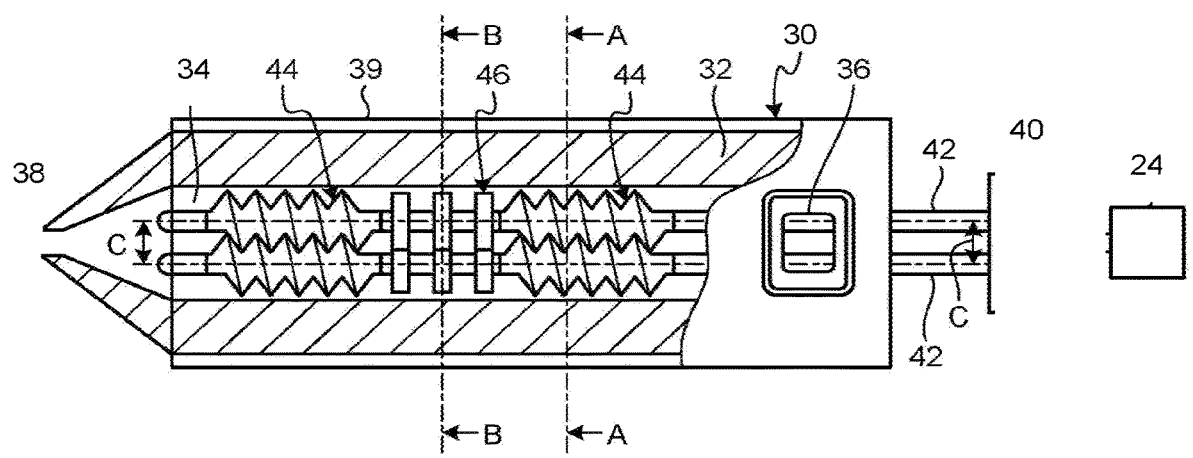
FIG. 3 is a schematic structural diagram of a twin-screw extrusion molding machine.
Figure 4A:
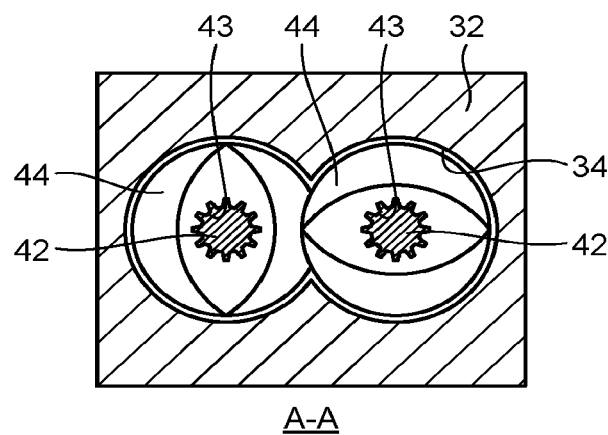
FIGS. 4A and 4B are cross-sectional views of an output shaft.
Figure 4B:
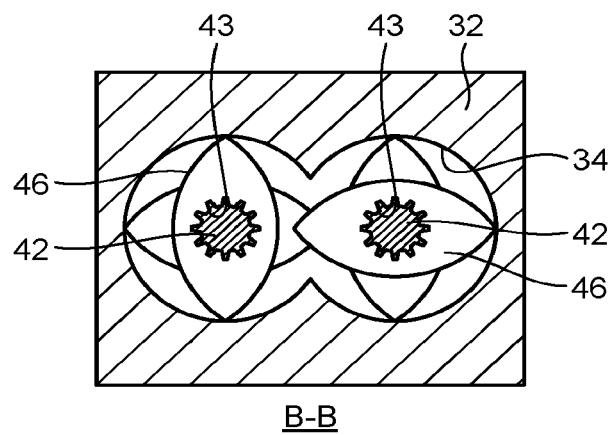

A schematic structure of the twin-screw extrusion molding machine 30 according to the present embodiment will be described with reference to FIGS. 3 to 4B. FIG. 3 is a schematic structural diagram of a twin-screw extrusion molding machine. FIGS. 4A and 4B are cross-sectional views of an output shaft.

The twin-screw extrusion molding machine 30 is driven according to the output of a gear box 40. That is, the gear box 40 decelerates the rotational driving force of a motor 24 to rotationally drive two output shafts 42 included in the twin-screw extrusion molding machine 30 in the same direction. A screw 44 and a kneading disk 46, which will be described later, are installed on the outer periphery of the output shaft 42, and with the rotation of the output shaft 42, a resin raw material (resin pellets of polypropylene or the like) fed into the twin-screw extrusion molding machine 30 is plasticized and melted for kneading and molding. In general, component molding using an extrusion molding machine is continuously performed, and for example, a long tubular component is molded. That is, it is necessary to continuously monitor the occurrence of an abnormality in a state where the extrusion molding machine is continuously operating for 24 hours, a week, a month, or the like. Note that the twin-screw extrusion molding machine 30 is an example of an extrusion molding machine in the present disclosure.

Note that the two output shafts 42 are disposed in parallel with each other with a certain inter-shaft distance C in the cylindrical housing (barrel) 32 of the twin-screw extrusion molding machine 30.

FIG. 4A is a cross-sectional view of the twin-screw extrusion molding machine 30 taken along a line A-A. As illustrated in FIG. 4A, the output shaft 42 is inserted into a spline hole 43 formed in the screw 44. The output shaft 42 meshes with the spline hole 43 to rotate the screw 44 inside an insertion hole 34.

FIG. 4B is a cross-sectional view of the twin-screw extrusion molding machine 30 taken along a line B-B. As illustrated in FIG. 4B, the output shaft 42 is inserted into the spline hole 43 formed in the kneading disk 46. The output shaft 42 meshes with the spline hole 43 to rotate the kneading disk 46 inside the insertion hole 34.

The screw 44 rotates, for example, at a speed of 300 revolutions per minute or the like to convey the resin raw material fed into the twin-screw extrusion molding machine 30 downstream of the twin-screw extrusion molding machine 30. The kneading disk 46 has a structure in which a plurality of elliptical disks is arranged in a direction orthogonal to the output shaft 42 and the directions of disks adjacent to each other along the output shaft 42 are shifted. Adjacent disks are arranged in a shifted manner to divide the flow of the resin raw material between the disks, thereby promoting kneading of the conveyed resin raw material. That is, the kneading disk 46 applies shear energy to the resin raw material that is heated by the heater 39 and conveyed by the screw 44 to completely melt the resin raw material.

The insertion hole 34 into which each output shaft 42 is inserted is formed inside the housing 32. The insertion hole 34 is a hole formed along the longitudinal direction of the housing 32, and has a shape in which cylinders overlap partially. As a result, the screw 44 and the kneading disk 46 can be inserted into the insertion hole 34 in a state of being meshed with each other.

Returning to FIG. 3 again, on one end side in the longitudinal direction of the housing 32, a material supply port 36 for feeding the pellet-like resin raw material and the material of a powdery filler, which are to be kneaded, into the insertion hole 34 is provided. A discharge port 38 that discharges the material kneaded while passing through the insertion hole 34 is provided on the other end side in the longitudinal direction of the housing 32. In addition, the heater 39 that heats the housing 32 to heat the resin raw material fed into the insertion hole 34 is provided on the outer periphery of the housing 32.

Note that in the example of FIG. 3, the output shaft 42 of the twin-screw extrusion molding machine 30 includes the screw 44 at two parts and the kneading disk 46 at one part, but the numbers of the screws 44 and the kneading disks 46 are not limited thereto. For example, the kneading disk 46 may be installed at a plurality of parts to knead the resin raw material.

[Description of Abnormality Detection Method]

In the twin-screw extrusion molding machine 30 in continuous operation, there is a high possibility that mainly two types of abnormalities occur. The first abnormality is the occurrence of so-called crushing in which the resin raw material reaches the kneading disk 46 in a state of not being sufficiently melted, and the unmelted resin raw material is crushed in the kneading disk 46. If such crushing occurs, the mechanical load on the kneading disk 46 increases, so that the life of the twin-screw extrusion molding machine 30 may be shortened, and in the worst case, the twin-screw extrusion molding machine 30 may be damaged. Consequently, in a case where the occurrence of crushing is detected, for example, it is necessary to increase the set temperature of the heater 39 to promote melting of the resin raw material.

The second anomaly is the occurrence of metal wear on the screw 44, the housing 32, or the kneading disk 46. When the unmelted resin raw material is crushed in the kneading disk 46, a reaction force is generated in the output shaft 42. At this time, there is a possibility that the output shaft 42 is bent and the screw 44, the housing 32, or the kneading disk 46 contacts the inner wall of the housing 32. In a case where such contact occurs, metal wear occurs in the screw 44, the housing 32, or the kneading disk 46, so that metal powder generated by metal wear may be mixed into the resin material. The amount of bending of the output shaft 42 is proportional to the amount of the unmelted resin raw material. Consequently, as soon as the occurrence of metal wear is detected, it is necessary to reduce the amount of the resin to be fed or increase the set temperature of the heater 39 to promote melting of the resin raw material.

An abnormality detection device 50a (see FIG. 6) for the twin-screw extrusion molding machine 30 according to the first embodiment detects two types of abnormalities, which have been described above, with one AE sensor installed on the surface of the housing 32 of the twin-screw extrusion molding machine 30.

According to an evaluation experiment by the inventors, it has been found that the magnitude of an AE output M(t) at a time t, the AE output M(t) being generated by metal wear of the screw 44, the housing 32, or the kneading disk 46, is clearly larger than the magnitude of an AE output M(t) generated when the resin raw material is crushed. That is, it has been found that it is possible to identify metal wear of the screw 44, the housing 32, or the kneading disk 46, or the occurrence of crushing of the resin raw material by comparing the magnitudes of the AE outputs M(t).

Note that the AE sensor 20 may be installed at any position as long as the AE sensor 20 is in contact with the housing 32 of the twin-screw extrusion molding machine 30, but is preferably installed near the kneading disk 46. This is to keep the magnitude of a signal of the AE output M(t) due to the occurrence of crushing of the resin raw material, which is lower than the AE output M(t) due to metal wear of the screw 44, the housing 32, or the kneading disk 46, at an observable magnitude.

Figure 5A:
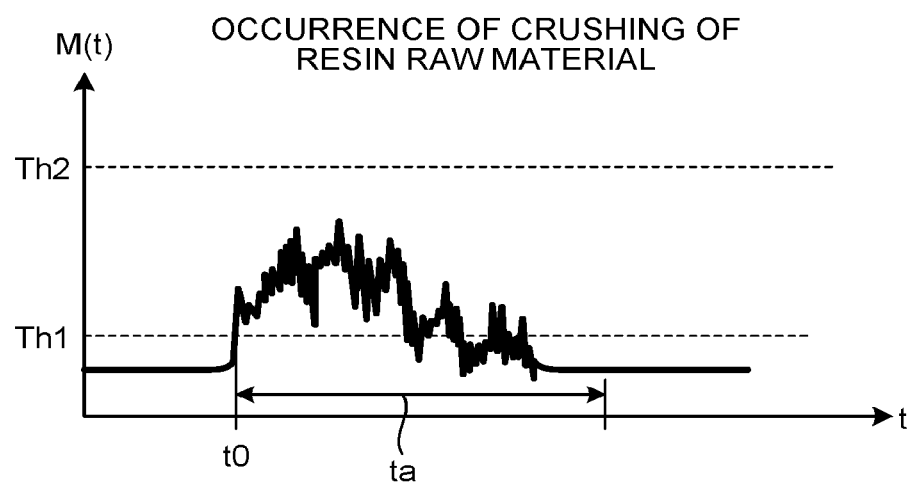
FIGS. 5A and 5B are explanatory diagrams of an AE output waveform.
Figure 5B:
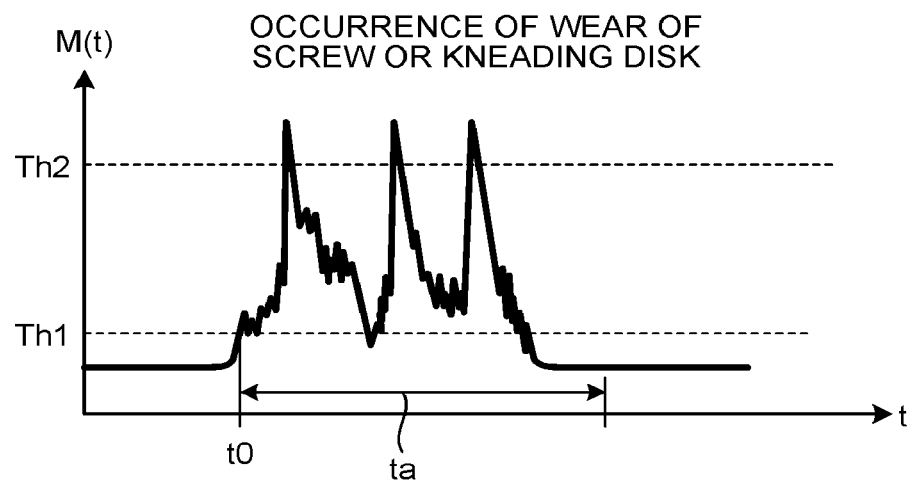

FIGS. 5A and 5B are explanatory diagrams of an AE output waveform. In particular, FIG. 5A is an example of an AE output M(t) in a case where crushing occurs. Furthermore, FIG. 5B is an example of an AE output M(t) in a case where metal wear occurs in the screw 44, the housing 32, or the kneading disk 46.

As illustrated in FIG. 5A, in a case where it is detected that the AE output M(t) exceeds a preset first threshold Th1, the abnormality detection device 50a determines that there is a possibility that crushing of a resin raw material occurs. Note that the first threshold Th1 is an example of a threshold.

In addition, as illustrated in FIG. 5B, in a case where it is detected that the AE output M(t) exceeds a second threshold Th2 larger than the first threshold Th1, the abnormality detection device 50a determines that wear of the screw 44, the housing 32, or the kneading disk 46 occurs. Note that the second threshold Th2 is an example of the threshold. Furthermore, the abnormality detection device 50a can also detect the occurrence of metal wear of the housing (barrel) 32 in addition to metal wear of the screw 44 or the kneading disk 46.

Note that the abnormality detection device 50a may monitor the AE output M(t), for example, for a predetermined time ta (for example, a second), after detecting that the AE output M(t) exceeds the first threshold Th1, and in a case where the AE output M(t) does not exceed the second threshold Th2 during the predetermined time ta, determine that crushing of an unmelted resin raw material occurs.

Note that since the first threshold Th1 varies depending on the type of a resin raw material to be used, an evaluation experiment for actually observing the AE output M(t) is performed in advance, and the first threshold Th1 is set on the basis of the intensity of an AE wave W generated at the time of the occurrence of crushing. Similarly, the evaluation experiment is performed in advance, and the second threshold Th2 is set on the basis of the intensity of an AE wave W generated when metal wear occurs in the screw 44, the housing 32, or the kneading disk 46.

[Description of Hardware Configuration of Abnormality Detection Device]

Figure 6:
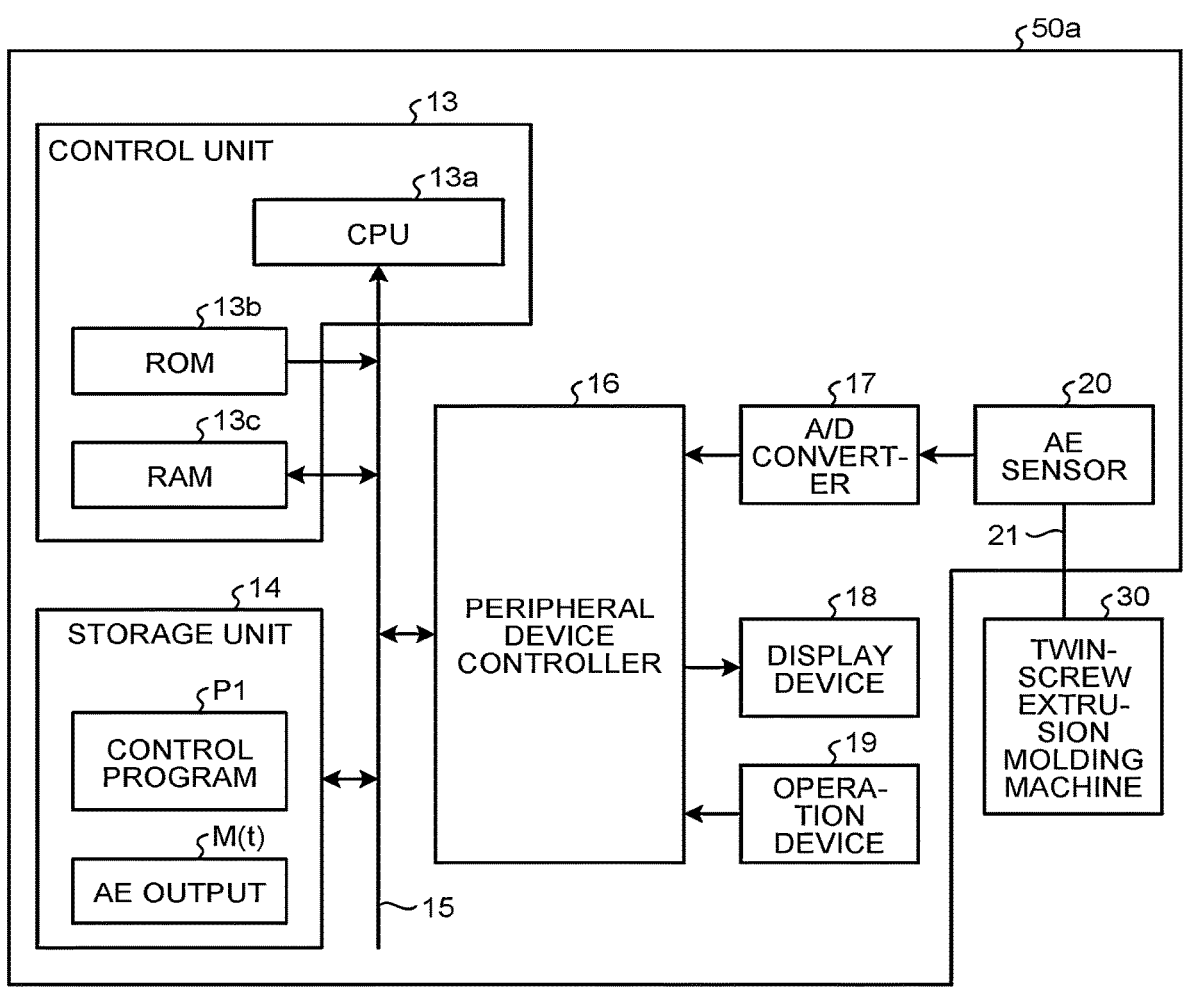
FIG. 6 is a hardware configuration diagram of an abnormality detection device for a twin-screw extrusion molding machine according to a first embodiment.

Next, a hardware configuration of the abnormality detection device 50a for the twin-screw extrusion molding machine 30 according to the first embodiment will be described with reference to FIG. 6. FIG. 6 is a hardware configuration diagram of an abnormality detection device for a twin-screw extrusion molding machine according to the first embodiment.

The abnormality detection device 50a for the twin-screw extrusion molding machine 30 is used in connection with the twin-screw extrusion molding machine 30, and includes a control unit 13, a storage unit 14, and a peripheral device controller 16.

The control unit 13 includes a central processing unit (CPU) 13a, a read only memory (ROM) 13b, and a random access memory (RAM) 13c. The CPU 13a is connected to the ROM 13b and the RAM 13c via a bus line 15. The CPU 13a reads a control program P1 stored in the storage unit 14 and develops the control program P1 in the RAM 13c. The CPU 13a operates in accordance with the control program P1 developed in the RAM 13c to control the operation of the control unit 13. That is, the control unit 13 has a configuration of a general computer that operates on the basis of the control program P1.

The control unit 13 is further connected to the storage unit 14 and the peripheral device controller 16 via the bus line 15.

The storage unit 14 is a non-volatile memory such as a flash memory, a hard disk drive (HDD), or the like that retains stored information even when the power is turned off. The storage unit 14 stores a program including the control program P1 and an AE output M(t) output from the AE sensor 20 at the time t. The control program P1 is a program for implementing the function of the control unit 13. The AE output M(t) is a signal obtained by converting the effective value of the detection signal D output from the AE sensor 20 into a digital signal by an A/D converter 17.

Note that the control program P1 may be provided by being incorporated in the ROM 13b in advance. Alternatively, it may be configured that the control program P1 is provided by being recorded in a computer-readable recording medium such as a CD-ROM, a flexible disk (FD), a CD-R, or a digital versatile disc (DVD) as a file in a format that can be installed or executed in the control unit 13. Furthermore, it may be configured that the control program P1 is stored on a computer connected to a network such as the Internet and provided by being downloaded via the network. Further, it may be configured that the control program P1 is provided or distributed via a network such as the Internet.

The peripheral device controller 16 is connected to the A/D converter 17, a display device 18, and an operation device 19. The peripheral device controller 16 controls the operation of various connected hardware on the basis of a command from the control unit 13.

The A/D converter 17 converts the detection signal D output from the AE sensor 20 into a digital signal and outputs the AE output M(t). Note that the AE sensor 20 detects the AE wave W transmitted through the housing 32 of the twin-screw extrusion molding machine 30 via the waveguide rod 21 as described above.

The display device 18 is, for example, a liquid crystal display. The display device 18 displays information related to the operation state of the abnormality detection device 50a. Furthermore, the display device 18 provides a notification when the abnormality detection device 50a detects an abnormality of the twin-screw extrusion molding machine 30.

The operation device 19 is, for example, a touch panel superimposed on the display device 18. The operation device 19 acquires operation information related to various operations of the abnormality detection device 50a for the twin-screw extrusion molding machine 30.

Note that the AE sensor 20 is installed on the surface of the housing 32 of the twin-screw extrusion molding machine 30 in the configuration described in FIG. 2. In addition, since the frequency band of a signal that can be detected varies depending on the type of the AE sensor 20, when the AE sensor 20 to be used is selected, it is desirable to select the AE sensor 20 that has high sensitivity with respect to the frequency of the AE wave W expected to be generated, in consideration of the material or the like of the twin-screw extrusion molding machine 30 to be detected.

[Description of Functional Configuration of Abnormality Detection Device]

Figure 7:
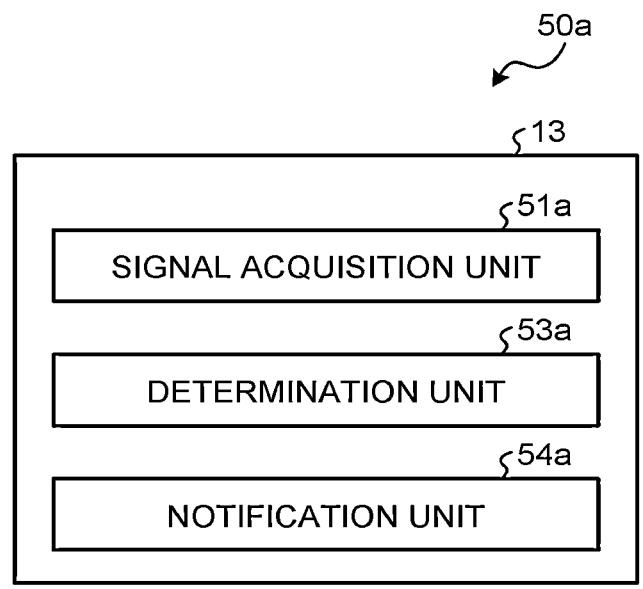
FIG. 7 is a functional configuration diagram of the abnormality detection device for a twin-screw extrusion molding machine according to the first embodiment.

Next, a functional configuration of the abnormality detection device 50a for the twin-screw extrusion molding machine 30 according to the first embodiment will be described with reference to FIG. 7. FIG. 7 is a functional configuration diagram of the abnormality detection device for a twin-screw extrusion molding machine according to the first embodiment. The control unit 13 of the abnormality detection device 50a develops the control program P1 in the RAM 13c and operates the control program P1, thereby implementing a signal acquisition unit 51a, a determination unit 53a, and a notification unit 54a illustrated in FIG. 7 as functional units.

When the twin-screw extrusion molding machine 30 that melts and kneads a fed resin raw material is in operation, the signal acquisition unit 51a (acquisition unit) acquires the detection signal D output from the AE sensor 20 installed on the surface of the housing 32 of the twin-screw extrusion molding machine 30. The signal acquisition unit 51a includes an amplifier and amplifies the detection signal D, and converts the effective value of the detection signal D as an analog signal into the AE output M(t) as a digital signal by the A/D converter 17.

The determination unit 53a determines whether an abnormality occurs in the twin-screw extrusion molding machine 30 on the basis of the relationship between the AE output M(t) acquired by the signal acquisition unit 51a and thresholds (the first threshold Th1 and the second threshold Th2).

That is, in a case where the AE output M(t) exceeds the second threshold Th2, the determination unit 53a determines that metal wear occurs in the screw 44, the housing 32, or the kneading disk 46. In addition, in a case where the AE output M(t) is less than the second threshold Th2 for the predetermined time to after exceeding the first threshold Th1, the determination unit 53a determines that crushing of an unmelted resin raw material occurs.

In a case where the determination unit 53a determines that an abnormality occurs in the twin-screw extrusion molding machine 30, the notification unit 54a provides a notification that an abnormality occurs. Specifically, the notification unit 54a displays on the display device 18 that an abnormality occurs in the twin-screw extrusion molding machine 30. Note that the notification unit 54a also displays the type of the detected abnormality (crushing of the resin raw material, or metal wear of the screw 44, the housing 32, or the kneading disk). Furthermore, the notification method of the notification unit 54a is not limited thereto, and the notification may be provided by turning on or blinking an indicator (not illustrated in FIG. 6), or may be provided by outputting sound or voice from a speaker or a buzzer (not illustrated in FIG. 6).

[Description of Flow of Process Performed by Abnormality Detection Device]

Figure 8:
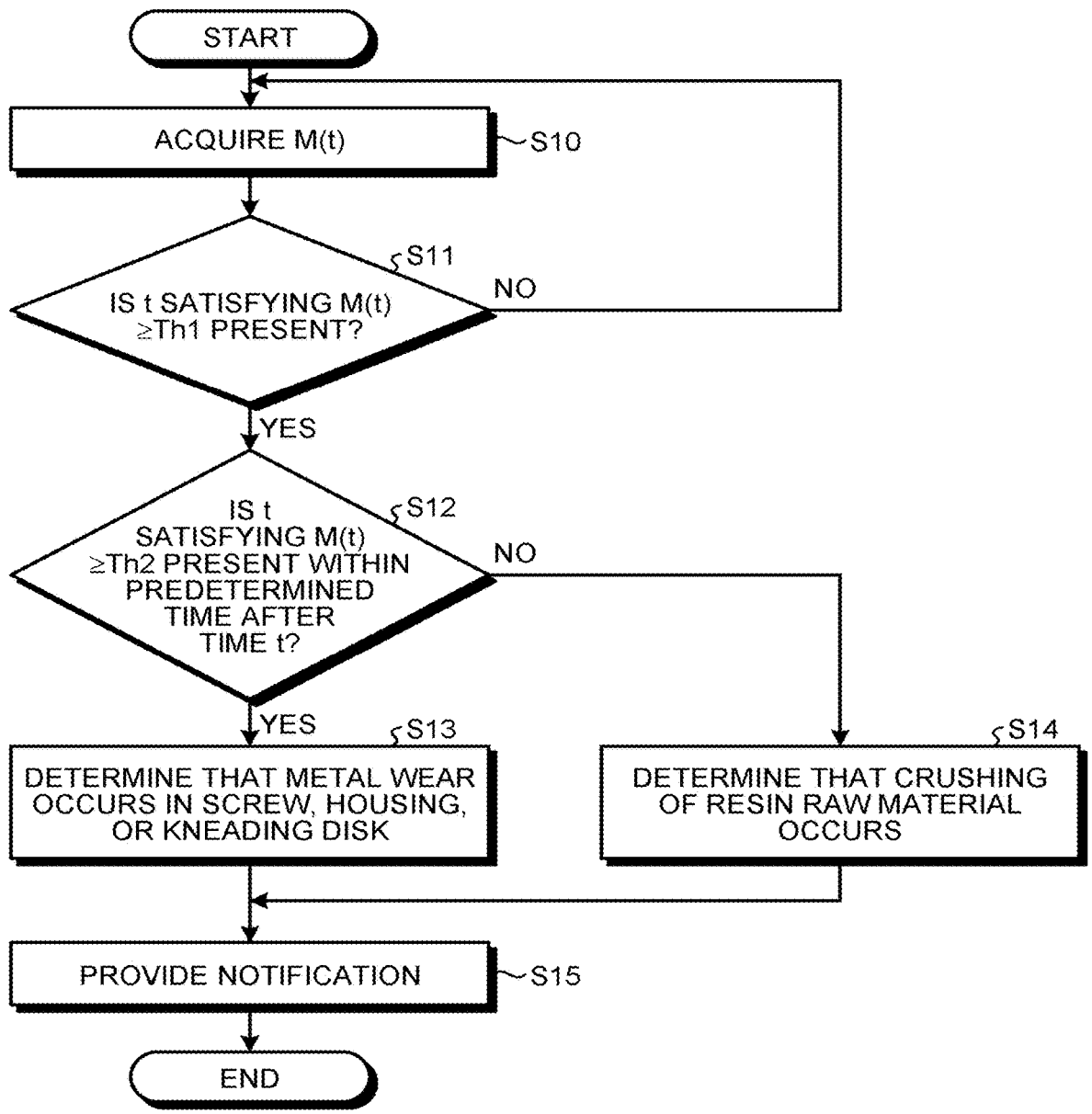
FIG. 8 is a flowchart illustrating an example of a flow of a process performed by the abnormality detection device for a twin-screw extrusion molding machine according to the first embodiment.

Next, a flow of a process performed by the abnormality detection device 50a for the twin-screw extrusion molding machine 30 according to the first embodiment will be described with reference to FIG. 8. FIG. 8 is a flowchart illustrating an example of a flow of a process performed by the abnormality detection device for a twin-screw extrusion molding machine according to the first embodiment.

The signal acquisition unit 51a acquires the AE output M(t) from the storage unit 14 (step S10). Note that the signal acquisition unit 51a may acquire an output of the AE sensor 20 in real time, or may acquire the output by reading the AE output M(t) once stored in the storage unit 14.

The determination unit 53a determines whether the time t satisfying M(t)≥Th1 is present (step S11). When it is determined that the time t satisfying M(t)≥Th1 is present (step S11: Yes), the process proceeds to step S12. On the other hand, when it is not determined that the time t satisfying M(t)≥Th1 is present (step S11: No), the process returns to step S10, the time t is updated, and the process is continued for the acquired AE output M(t).

When it is determined as Yes in step S11, the determination unit 53a determines whether the time t satisfying M(t)≥Th2 is present within the predetermined time to after the time t (step S12). When it is determined that the time t satisfying M(t)≥Th2 is present (step S12: Yes), the process proceeds to step S13. On the other hand, when it is not determined that the time t satisfying M(t)≥Th2 is present (step S12: No), the process proceeds to step S14.

When it is determined as Yes in step S12, the determination unit 53a determines that metal wear occurs in the screw 44, the housing 32, or the kneading disk 46 of the twin-screw extrusion molding machine 30 (step S13). Thereafter, the process proceeds to step S15.

On the other hand, when it is determined as No in step S12, the determination unit 53a determines that crushing of the unmelted resin raw material occurs in the kneading disk 46 of the twin-screw extrusion molding machine 30. Thereafter, the process proceeds to step S15.

Subsequent to step S13 or step S14, the notification unit 54a provides a notification that an abnormality occurs in the twin-screw extrusion molding machine 30 (step S15). Note that it is desirable that the notification unit 54a provides a notification according to the detected abnormality to distinguish whether metal wear occurs in the screw 44, the housing 32, or the kneading disk 46 or whether crushing of the resin raw material occurs.

Thereafter, the abnormality detection device 50a ends the process for the AE output M(t) acquired in step S10. Note that, in practice, the twin-screw extrusion molding machine 30 continuously operates, and thus the abnormality detection device 50a returns to step S10 again, acquires a new AE output M(t), and continues the process of FIG. 8.

As described above, in the abnormality detection device 50a of the first embodiment, when the twin-screw extrusion molding machine 30 (extrusion molding machine) that melts and kneads a fed resin raw material is in operation, the signal acquisition unit 51a (acquisition unit) acquires the AE output M(t) of the AE sensor 20 installed on the surface of the housing 32 of the twin-screw extrusion molding machine 30. The determination unit 53a then determines whether an abnormality occurs in the twin-screw extrusion molding machine 30 on the basis of the relationship between the AE output M(t) and the first threshold Th1 and the second threshold Th2. As a result, the occurrence of an abnormality of the AE output M(t) due to the abnormality of the twin-screw extrusion molding machine 30 during a continuous operation can be reliably detected.

Furthermore, in the abnormality detection device 50a of the first embodiment, the determination unit 53a determines that crushing of the unmelted resin raw material occurs in the kneading disk 46 in a case where the output of the AE sensor 20 exceeds the first threshold Th1 and does not exceed the second threshold Th2 larger than the first threshold Th1. Consequently, the molten state of the resin raw material can be reliably detected.

Moreover, in the abnormality detection device 50a of the first embodiment, the determination unit 53a determines that metal wear occurs in the screw 44 that conveys the resin raw material from upstream to downstream, the housing 32, or the kneading disk 46 in a case where the output of the AE sensor 20 exceeds the second threshold Th2 larger than the first threshold Th1. Consequently, the occurrence of metal wear of the screw 44, the housing 32, or the kneading disk 46 can be reliably detected.

Further, in the abnormality detection device 50a of the first embodiment, in a case where the determination unit 53a determines that an abnormality occurs in the twin-screw extrusion molding machine 30, the notification unit 54a provides a notification that an abnormality occurs. Consequently, it is possible to promptly notify and respond to the occurrence of the abnormality.

Second Embodiment

A second embodiment of the present disclosure is an example of the abnormality detection device for a twin-screw extrusion molding machine that detects and notifies the occurrence of an abnormality during operation. In particular, in the second embodiment, two AE sensors installed on the surface of the housing 32 of the twin-screw extrusion molding machine 30 estimate the part where an abnormality occurs in the twin-screw extrusion molding machine 30. Note that the twin-screw extrusion molding machine is an example, and the present disclosure is applicable to an extrusion molding machine such as a single-screw extrusion molding machine or a multi-screw extrusion molding machine.

[Description of Hardware Configuration of Abnormality Detection Device]

Figure 9:
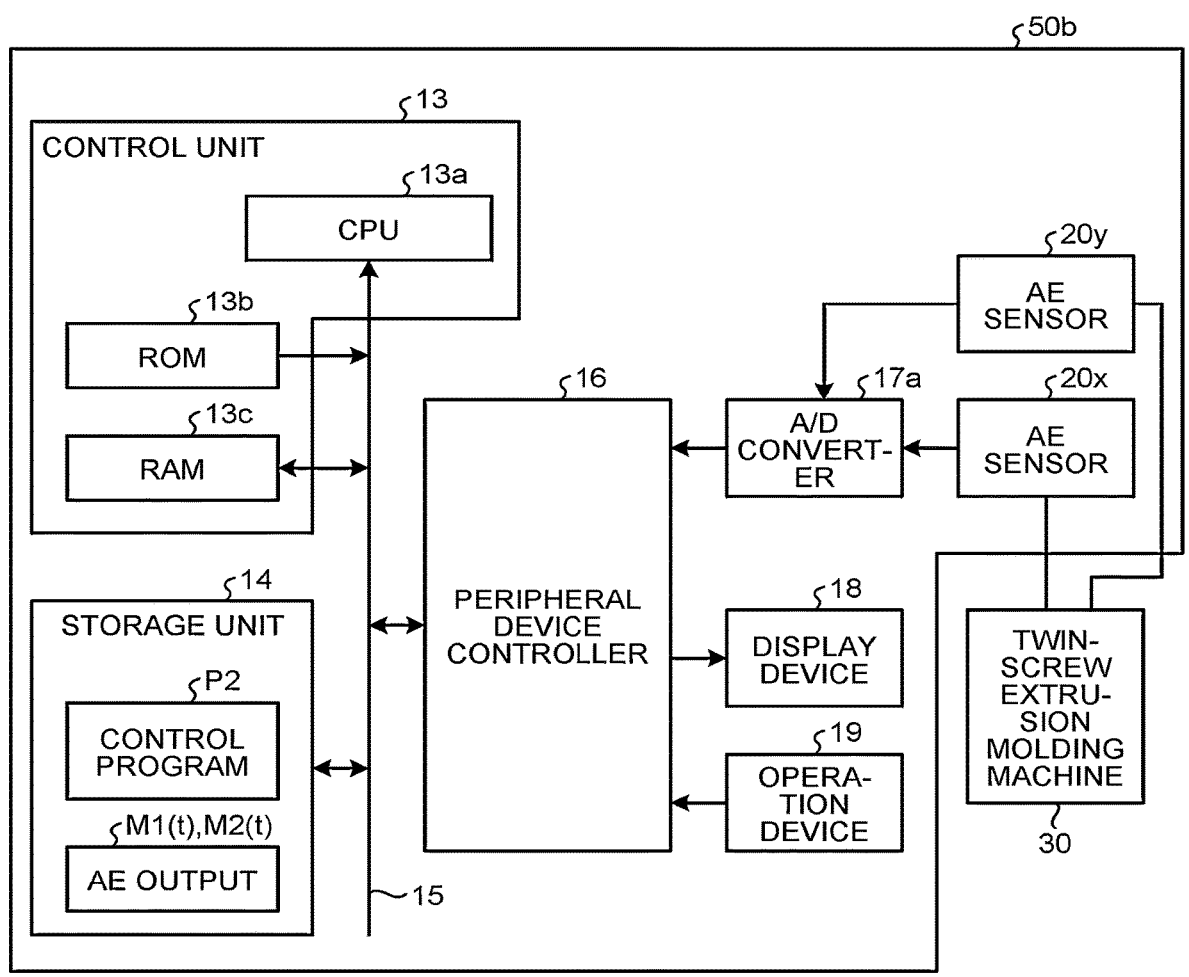
FIG. 9 is a hardware configuration diagram of an abnormality detection device for a twin-screw extrusion molding machine according to a second embodiment.

A hardware configuration of an abnormality detection device 50b for the twin-screw extrusion molding machine 30 according to the second embodiment will be described with reference to FIG. 9. FIG. 9 is a hardware configuration diagram of an abnormality detection device for a twin-screw extrusion molding machine according to the second embodiment.

The abnormality detection device 50b for the twin-screw extrusion molding machine 30 is used in connection with the twin-screw extrusion molding machine 30, and includes the control unit 13, the storage unit 14, and the peripheral device controller 16. Since the basic structure of the abnormality detection device 50b is the same as that of the abnormality detection device 50a described in the first embodiment, the description of the same part is omitted.

The abnormality detection device 50b includes two AE sensors with the same specifications. Each of AE sensors 20x and 20y is installed in the twin-screw extrusion molding machine 30 via the waveguide rod 21. An AE output M1(t) of the AE sensor 20x and an AE output M2(t) of the AE sensor 20y are each A/D-converted into digital signals by an A/D converter 17a. At this time, the A/D converter 17a samples (for example, 100 times per second or the like) the two AE outputs M1(t) and M2(t) at the same timing. That is, digitized AE outputs M1(t) and M2(t) can compare the occurrence time of the AE output with each other.

Note that the AE sensors 20x and 20y are installed on the upstream side and the downstream side through which a resin raw material fed into the twin-screw extrusion molding machine 30 flows. Preferably, the AE sensors 20x and 20y are installed at least at two parts upstream and downstream of the kneading disk 46 that kneads the resin raw material.

The entire operation of the abnormality detection device 50b is managed by a control program P2 stored in the storage unit 14.

[Description of Functional Configuration of Abnormality Detection Device]

Figure 10:
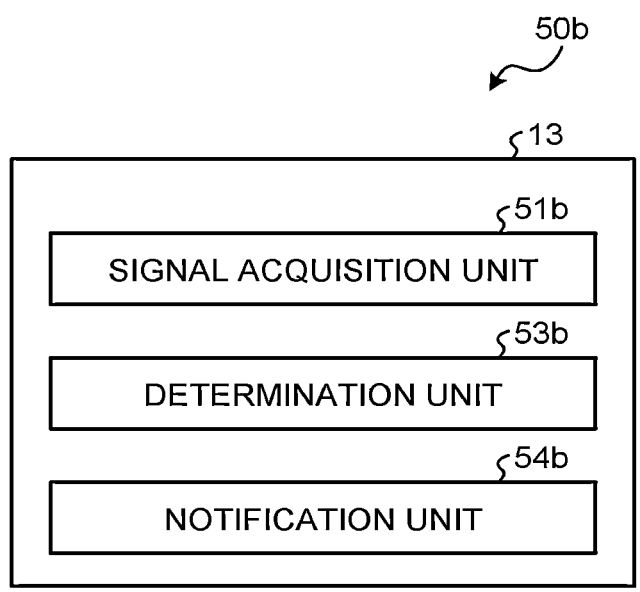
FIG. 10 is a functional configuration diagram of the abnormality detection device for a twin-screw extrusion molding machine according to the second embodiment.

FIG. 10 is a functional configuration diagram of the abnormality detection device for the twin-screw extrusion molding machine according to the second embodiment. The control unit 13 of the abnormality detection device 50b develops the control program P2 in the RAM 13c and operates the control program P2, thereby implementing a signal acquisition unit 51b, a determination unit 53b, and a notification unit 54b illustrated in FIG. 10 as functional units.

The signal acquisition unit 51b (acquisition unit) acquires the detection signals D output from the AE sensors 20x and 20y installed on the surface of the housing 32 of the twin-screw extrusion molding machine 30 in operation. The signal acquisition unit 51b includes an amplifier and amplifies the detection signals D, and converts the effective values of the detection signals D as analog signals into AE outputs M1(t) and M2(t) as digital signals by the A/D converter 17. Note that the AE output M1(t) is an output of the AE sensor 20x. Further, the AE output M2(t) is an output of the AE sensor 20y.

The determination unit 53b estimates the part where the abnormality of the twin-screw extrusion molding machine 30 occurs on the basis of the difference between the time when the AE outputs M1(t) and M2(t) acquired by the signal acquisition unit 51b exceed the first threshold Th1 or the difference between the time when the AE outputs M1(t) and M2(t) exceed the second threshold Th2.

The notification unit 54b notifies the part where the abnormality occurs in a case where the determination unit 53b estimates the part where the abnormality of the twin-screw extrusion molding machine 30 occurs.

[Description of Method of Estimating Part where Abnormality Occurs]

Figure 11A:
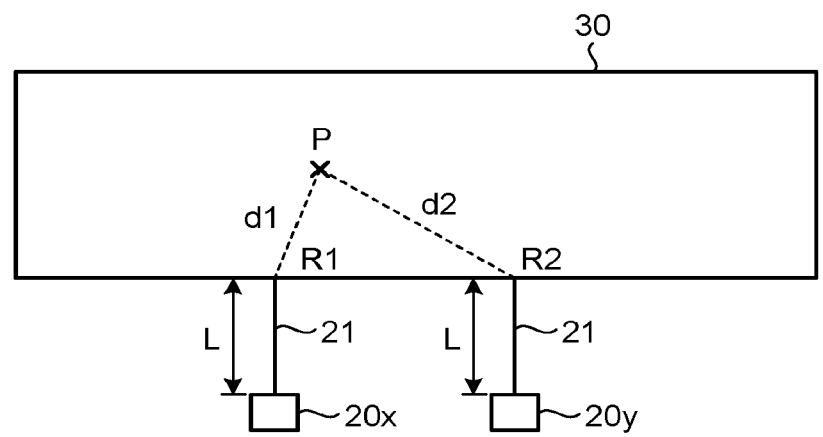
FIGS. 11A and 11B are explanatory diagrams of a method of estimating an abnormality occurrence position performed by the abnormality detection device for a twin-screw extrusion molding machine according to the second embodiment.
Figure 11B:
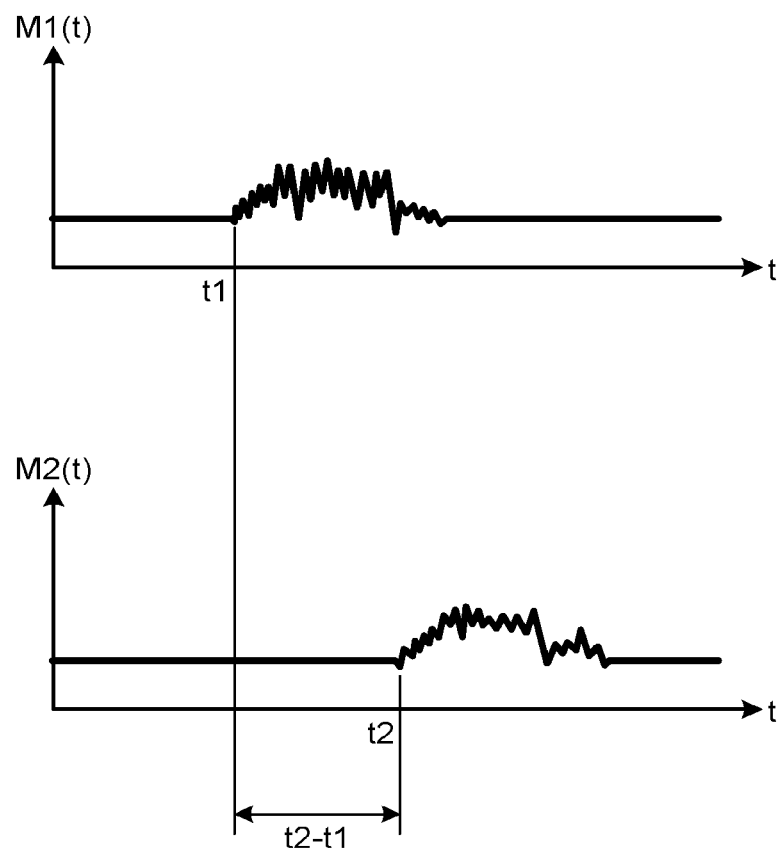

A method in which the abnormality detection device 50b estimates the part where an abnormality occurs will be described with reference to FIGS. 11A and 11B. FIGS. 11A and 11B are explanatory diagrams of a method of estimating an abnormality occurrence position performed by the abnormality detection device for a twin-screw extrusion molding machine according to the second embodiment.

FIG. 11A illustrates a state where two AE sensors 20x and 20y are installed in the twin-screw extrusion molding machine 30. Now, it is assumed that an abnormality occurs at the point P. At this time, the generated AE wave W is transmitted through the housing 32 of the twin-screw extrusion molding machine 30 and the waveguide rods 21, and detected by the AE sensors 20x and 20y. It is assumed that the waveguide rod 21 connected to the AE sensor 20x is fixed to the housing 32 of the twin-screw extrusion molding machine 30 at a point R1. Furthermore, it is assumed that the waveguide rod 21 connected to the AE sensor 20y is fixed to the housing 32 of the twin-screw extrusion molding machine 30 at a point R2. In addition, it is assumed that the length of the waveguide rod 21 is L.

At this time, a path from the point P to the AE sensor 20x and a path from the point P to the AE sensor 20y have a different distance. Consequently, the time required for the AE wave W generated at the point P to be transmitted to the AE sensor 20x is different from the time required for the AE wave W to be transmitted to the AE sensor 20y.

FIG. 11B is a diagram in which the AE output M1(t) output from the AE sensor 20x and the AE output M2(t) output from the AE sensor 20y are displayed side by side with time axes aligned. As can be seen from FIG. 11B, the AE wave W generated at the point P is first transmitted to the AE sensor 20x and then to the AE sensor 20y after some delay.

Assuming that the time when the AE wave W generated at the point P is transmitted to the AE sensor 20x is denoted by t1 and the time when the AE wave W generated at the point P is transmitted to the AE sensor 20y is denoted by t2, the point P is estimated to be at a position close to the AE sensor 20x by the distance by which the AE wave W travels during a time difference (t2−t1).

More specifically, it is assumed that the traveling speed of the AE wave W inside the housing 32 is denoted by v1, and the traveling speed of the AE wave W in the waveguide rod 21 is denoted by v2. In addition, assuming that the distance between the point P and the point R1 is denoted by d1 and the distance between the point P and the point R2 is denoted by d2, the AE wave W generated at the point P is transmitted to the AE sensor 20x at the time t1, and thus Equation (1) is established.

$$d1/v1 + L/v2 = t1 \tag{1}$$

Furthermore, since the AE wave W generated at the point P is transmitted to the AE sensor 20y at the time t2, Equation (2) is established.

$$d2/v1 + L/v2 = t2 \tag{2}$$

When Equation (1) is transformed, the distance d1 can be calculated by Equation (3).

$$d1 = (t1 - L/v2) * v1 \tag{3}$$

Further, when Equation (2) is transformed, the distance d2 can be calculated by Equation (4).

$$d2=(t2-L/v2)*v1 \quad (4)$$

That is, the position of the point P can be estimated as a position of an intersection of an arc whose radius is the distance d1 around the point R1 and an arc whose radius is the distance d2 around the point R2.

As described above, the abnormality detection device 50b of the second embodiment estimates the position of the point P, which is the position where the AE wave W is generated, by observing one AE wave W by the AE sensors 20x and 20y installed at a plurality of different positions and detecting the time difference at which the occurrence of an abnormality is detected.

[Description of Flow of Process Performed by Abnormality Detection Device]

Figure 12:
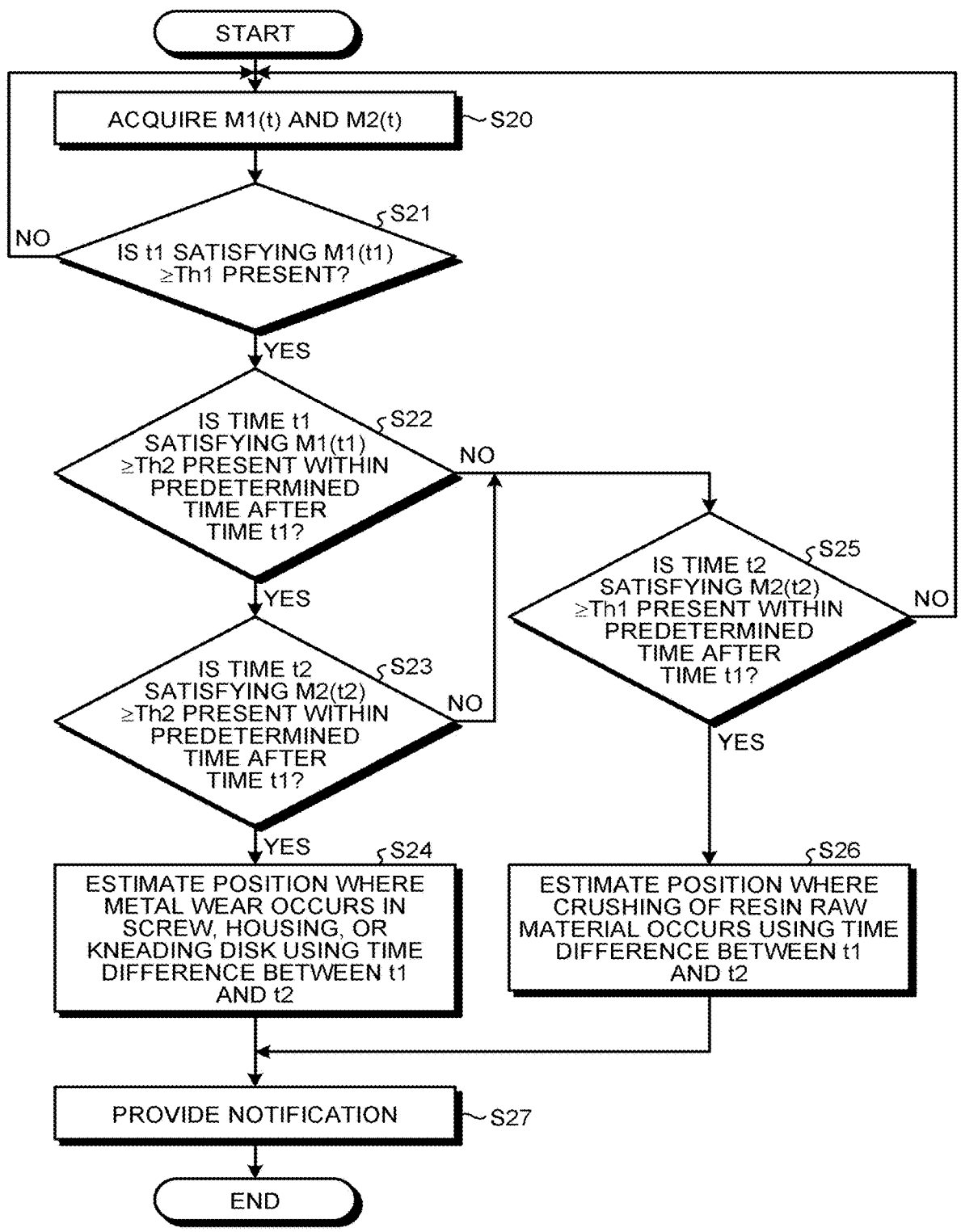
FIG. 12 is a flowchart illustrating an example of a flow of a process performed by the abnormality detection device for a twin-screw extrusion molding machine according to the second embodiment.

A flow of a process performed by the abnormality detection device 50b for the twin-screw extrusion molding machine 30 according to the second embodiment will be described with reference to FIG. 12. FIG. 12 is a flowchart illustrating an example of a flow of a process performed by the abnormality detection device for a twin-screw extrusion molding machine according to the second embodiment.

A signal acquisition unit 51 acquires the AE outputs M1(t) and M2(t) from the storage unit 14 (step S20). Note that the signal acquisition unit 51 may acquire the AE outputs M1(t) and M2(t) stored in advance in the storage unit 14, or may acquire the outputs of the AE sensors 20x and 20y in real time.

The determination unit 53b determines whether the time t satisfying M1(t)≥Th1 is present (step S21). When it is determined that the time t satisfying M1(t)≥Th1 is present (step S21: Yes), the process proceeds to step S22. On the other hand, when it is not determined that the time t satisfying M1(t)≥Th1 is present (step S21: No), the process returns to step S20, the time t is updated, and the process is continued for the acquired AE outputs M1(t) and M2(t).

When it is determined as Yes in step S21, the determination unit 53b determines whether the time t1 satisfying M1(t1)≥Th2 is present within the predetermined time ta after the time t (step S22). When it is determined that the time t1 satisfying M1(t1)≥Th2 is present (step S22: Yes), the process proceeds to step S23. On the other hand, when it is not determined that the time t1 satisfying M1(t1)≥Th2 is present (step S22: No), the process proceeds to step S25.

When it is determined as Yes in step S22, the determination unit 53b determines whether the time t2 satisfying M2(t2)≥Th2 is present within the predetermined time ta after the time t1 (step S23). When it is determined that the time t2 satisfying M2(t2)≥Th2 is present (step S23: Yes), the process proceeds to step S24. On the other hand, when it is not determined that the time t2 satisfying M2(t2)≥Th2 is present (step S23: No), the process proceeds to step S25.

When it is determined as Yes in step S23, the determination unit 53b estimates the position where metal wear occurs in the screw 44, the housing 32, or the kneading disk 46 using the time difference between the time t1 and the time t2 (step S24). Thereafter, the process proceeds to step S27.

When it is determined as No in step S22 or step S23, the determination unit 53b determines whether the time t2 satisfying M2(t2)≥Th1 is present within the predetermined time ta after the time t1 (step S25). When it is determined that the time t2 satisfying M2(t2)≥Th1 is present (step S25: Yes), the process proceeds to step S26. On the other hand, when it is not determined that the time t2 satisfying M2(t2)≥Th1 is present (step S25: No), the process returns to step S20, the time t is updated, and the process is continued for the acquired AE outputs M1(t) and M2(t).

When it is determined as Yes in step S25, the determination unit 53b estimates the position where crushing of an unmelted resin raw material occurs using the time difference between the time t1 and the time t2 (step S26). Thereafter, the process proceeds to step S27.

Subsequent to step S24 or step S26, the notification unit 54b provides a notification that an abnormality occurs in the twin-screw extrusion molding machine 30 and a notification that indicates the position where the abnormality occurs (step S27). Thereafter, the abnormality detection device 50b ends the process of FIG. 12. Note that, in practice, the twin-screw extrusion molding machine 30 continuously operates, and thus the abnormality detection device 50b returns to step S20 again, acquires new AE outputs M1(t) and M2(t), and continues the process of FIG. 12.

As described above, in the abnormality detection device 50b of the second embodiment, the AE sensors 20x and 20y are installed at least at two parts on the upstream side and the downstream side through which the resin raw material fed into the twin-screw extrusion molding machine 30 (extrusion molding machine) flows. The determination unit 53b then estimates the part where the abnormality of the twin-screw extrusion molding machine 30 occurs on the basis of the difference between the time when the AE outputs M1(t) and M2(t) of the AE sensors 20x and 20y acquired by the signal acquisition unit 51b (acquisition unit) exceed the first threshold Th1 or the second threshold Th2. Consequently, since the position where an abnormality occurs in the twin-screw extrusion molding machine 30 can be estimated, the adjustment operation of the twin-screw extrusion molding machine 30 can be efficiently performed when an abnormality occurs.

That is, when it is detected that metal wear occurs in the screw 44, the housing 32, or the kneading disk 46, the screw 44, the housing 32, or the kneading disk 46 can be efficiently replaced. In addition, when the occurrence of crushing is detected, the twin-screw extrusion molding machine 30 can be efficiently adjusted to promote melting of the resin raw material, such as increasing the set temperature of the heater 39, changing the form of the kneading disk 46, or increasing the rotation speed of the output shaft 42.

Furthermore, in the abnormality detection device 50b of the second embodiment, the AE sensors 20x and 20y are installed upstream and downstream of the kneading disk 46. Consequently, it is possible to detect the position where crushing of an unmelted resin raw material occurs more reliably in the kneading disk 46.

Third Embodiment

In a third embodiment of the present disclosure, similarly to the second embodiment, two AE sensors 20x and 20y installed on the surface of the housing 32 of the twin-screw extrusion molding machine 30 estimate the part where an abnormality occurs in the twin-screw extrusion molding machine 30. Note that the third embodiment is different from the second embodiment in a signal processing method.

In general, component molding using an extrusion molding machine is continuously performed, and for example, a long tubular component is molded. That is, it is necessary to continuously monitor the occurrence of an abnormality even in a state where the extrusion molding machine is continuously operating for 24 hours, a week, a month, or the like. In order to continuously monitor the output of an AE sensor for a long period of time, it is necessary to perform monitoring in a state where a resin raw material is continuously fed, that is, in a state where the resin raw material in a molten state and the resin raw material in an unmolten state are mixed. In such a state, the output of the AE sensor constantly varies according to a change in the molten state of the resin raw material, a change in the operating state of the twin-screw extrusion molding machine, or the like. Consequently, in determining the magnitude of the AE output, it is desirable to be able to identify whether it is a simple output variation or an output variation due to an abnormality.

An abnormality detection device 50c for the twin-screw extrusion molding machine 30 according to the third embodiment (see FIG. 14) detects only the variation due to an abnormality even in a case where the variation due to the state change of the AE outputs M1($t$) and M2($t$) occurs.

In general, the variation of the AE outputs M1($t$) and M2($t$) due to the state change of the twin-screw extrusion molding machine 30 is gentle with respect to time, whereas the variation of the AE outputs M1($t$) and M2($t$) due to an abnormality of the twin-screw extrusion molding machine 30 is rapid with respect to time. The abnormality detection device 50c uses such a difference in the variation state of the AE output to detect only the variation due to an abnormality. Whether or not the temporal change of an observation waveform is gentle is generally evaluated by performing frequency analysis, but in the present embodiment, in order to reduce the processing amount of the abnormality detection device 50c, evaluation is performed using the difference value between the AE outputs M1($t$) and M2($t$) and the moving average value of the AE outputs M1($t$) and M2($t$), that is, the variation amount of the AE outputs M1($t$) and M2($t$).

The moving average value of the AE output M1($t$) is a waveform obtained by smoothing the AE output M1($t$). Consequently, the difference value between the AE output M1($t$) and the moving average value of the AE output M1($t$) is a small value when the AE output M1($t$) varies gently. On the other hand, the difference value is a large value when the AE output M1($t$) changes rapidly. That is, the difference value is an output representing the variation amount of the AE output M1($t$). By comparing this output (the difference value) with a threshold, it is possible to detect the time when an abnormality has possibly occurred.

After the time when an abnormality has possibly occurred is detected, a threshold process is performed on the difference value after the time, thereby determining the type of the abnormality (whether crushing of the resin raw material or metal wear of the screw 44, the housing 32, or the kneading disk 46), as described in the first and second embodiments. Note that the thresholds (the first threshold Th1 and the second threshold Th2) described in the first and second embodiments are used as the threshold at the time of performing the threshold process on the difference value, but a specific value of each threshold can be set according to the state of the output (the difference value), that is, the degree of smoothing of the original AE output M(t) by performing an evaluation experiment or the like in advance, unlike the values used in the first and second embodiments. Specifically, it is desirable to set the first threshold Th1 and the second threshold Th2 to smaller values as the degree of smoothing of the difference value is higher.

[Description of Abnormality Detection Method]

Figure 13:
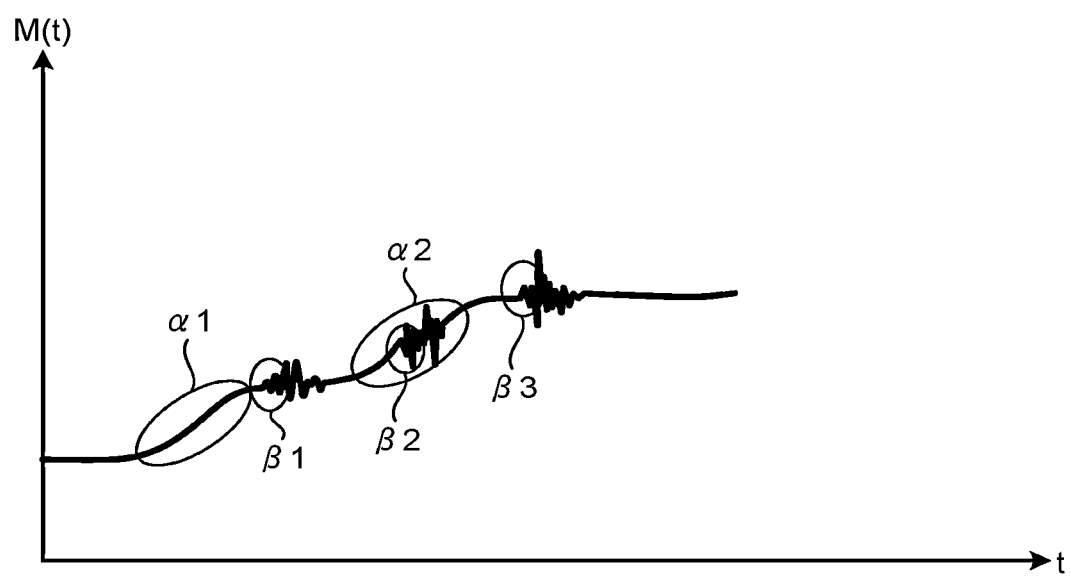
FIG. 13 is an explanatory diagram of an AE output waveform at the time of continuous monitoring.

Hereinafter, the abnormality detection method in the present embodiment will be described more specifically. FIG. 13 is an explanatory diagram of an AE output waveform at the time of continuous monitoring. Generally, regions α1 and α2 in which the output varies gently are generated in the AE output M(t) obtained when the twin-screw extrusion molding machine 30 is continuously monitored. The regions α1 and α2 appear, for example, in a case where the state of the twin-screw extrusion molding machine 30 changes, such as in a case where a new resin raw material is fed or in a case where the temperature of the twin-screw extrusion molding machine 30 changes.

The AE wave W generated due to an abnormality of the twin-screw extrusion molding machine 30 is observed to be superimposed on the state change described above. That is, regions β1, β2, and β3 illustrated in FIG. 13 are waveforms generated due to the abnormality of the twin-screw extrusion molding machine 30.

As described above, since the waveform generated due to the abnormality of the twin-screw extrusion molding machine 30 appears to be superimposed on the AE output M(t) due to the state change of the twin-screw extrusion molding machine 30, it is desirable to perform the threshold process using a variable threshold in order to detect the regions β1, β2, and β3.

However, since the level of the AE output M(t) generated due to the state change of the twin-screw extrusion molding machine 30 cannot be predicted, in the present embodiment, the occurrence of an abnormality in the twin-screw extrusion molding machine 30 is detected by the following method.

In general, the variation of the AE output M(t) due to the state change of the twin-screw extrusion molding machine 30 is gentler than the variation of the AE output M(t) due to the occurrence of an abnormality. For this reason, the tendency of the variation of the AE output M(t) can be grasped to identify the variation of the AE output M(t) due to the state change of the twin-screw extrusion molding machine 30 and the variation of the AE output M(t) due to the occurrence of the abnormality.

There are various methods of analyzing the tendency of the change in a signal waveform, but in the present embodiment, identification is performed on the basis of the difference value between the AE output M(t) itself and the moving average value of the AE output M(t). The moving average is one of methods of smoothing series data.

It is assumed that the moving average value of the AE output M(t) at the time t is denoted by MA(M(t)). The moving average value MA(M(t)) is then calculated by Equation (5).

$$MA(M(t)) = (M(t-(n-1)\Delta t) + \ldots + M(t))/n \qquad (5)$$

Here, Δt is a sampling interval of the AE output M(t). Equation (5) represents that the average value of n (n=2, 3, . . . ) AE outputs M(t) including the time t is set as the moving average value at the time t.

In the present embodiment, it is determined whether or not a difference value E between the AE output M(t) and the moving average value MA(M(t)) is larger than or equal to the preset first threshold Th1. The first threshold Th1 is a preset threshold, but a specific value of the first threshold Th1 is a value that is unique to the present embodiment and is different from the values used in the first and second embodiments. That is, the first threshold Th1 in the present embodiment can be set to a value that allows the difference value E generated when the resin raw material is crushed to be detected among the difference values E that are time-series data. Specifically, the first threshold Th1 in the present embodiment is desirably set according to the state of the difference value E, that is, the degree of smoothing of the AE output M(t).

In a case where the difference value E is larger than or equal to the first threshold Th1, it is determined that a large variation occurs in the AE output M(t) in a short time, that is, there is a high possibility that an abnormality occurs in the twin-screw extrusion molding machine 30 at the time t. On the other hand, in a case where the difference value E is smaller than the first threshold Th1, it is determined that the AE output M(t) is stable at the time t, or the AE output M(t) gently varies due to the state change of the twin-screw extrusion molding machine 30.

Note that the time range of calculating the moving average value MA(M(t)) can be determined by performing an evaluation experiment or the like in advance. In determining the time range of calculating the moving average value MA(M(t)), it is desirable to consider a frequency component of the AE output M(t) generated due to the state change of the twin-screw extrusion molding machine 30 and a frequency component of the AE output M(t) generated due to an abnormality of the twin-screw extrusion molding machine 30. As the time range of calculating the moving average value MA(M(t)) is set to be wider, a higher frequency component of the AE output M(t) is removed (the smoothing effect is higher). Consequently, it is desirable to set the time range of calculating the moving average value MA(M(t)) so that when the moving average value MA(M(t)) is calculated, the frequency component of the AE output M(t) due to the state change of the twin-screw extrusion molding machine 30 remains and the frequency component of the AE output M(t) due to the abnormality of the twin-screw extrusion molding machine 30 is cut.

Then, in a case where the difference value E is larger than or equal to the first threshold Th1 at the time t, it is further determined whether the difference value E after the time t is less than the second threshold Th2 larger than the first threshold Th1.

In a case where the difference value E is larger than or equal to the first threshold Th1 and does not exceed the second threshold Th2, it is determined that crushing occurs in the twin-screw extrusion molding machine 30. Furthermore, in a case where the difference value E is equal to or larger than the second threshold Th2, it is determined that metal wear occurs in the screw 44, the housing 32, or the kneading disk 46. The second threshold Th2 is a preset threshold similarly to the second threshold Th2 described in the first and second embodiments. A specific value of the second threshold Th2 is a value unique to the present embodiment and is different from the values used in the first and second embodiments. That is, the second threshold Th2 in the present embodiment can be set to a value that allows the difference value E generated when metal wear occurs in the screw 44, the housing 32, or the kneading disk 46 to be detected among the difference values E that are time-series data. Specifically, the second threshold Th2 in the present embodiment is desirably set according to the state of the difference value E, that is, the degree of smoothing of the AE output M(t).

Note that the abnormality detection method described above is an example, and the occurrence of an abnormality may be detected by other methods. For example, the occurrence of an abnormality may be directly detected from the value of the AE output M(t) itself, instead of using the moving average value.

That is, it may be determined whether or not an abnormality occurs by performing the threshold process using a predetermined threshold (for example, a predetermined value S) on the difference value M(t)–M(t–nΔt) between the AE output M(t) at the time t and the AE output M(t–nΔt) in the past by a predetermined time nΔt (n=1, 2, . . . ) in the same manner as described above.

In this case, if there is a variation exceeding the predetermined value S between the past AE output M(t–nΔt) and the current AE output M(t), that is, if there is a sharp variation of the AE output M(t), it is determined that there is a possibility that an abnormality occurs at the time t. On the other hand, if there is no variation exceeding the predetermined value S between the past AE output M(t–nΔt) and the current AE output M(t), that is, if there is no sharp variation of the AE output M(t), it is not determined that an abnormality occurs at the time t.

Then, in a case where the value of the AE output M(t) at the time t when it is determined that there is a possibility that an abnormality occurs exceeds the first threshold Th1 and does not exceed the second threshold Th2, it is determined that crushing occurs at the time t.

Furthermore, in a case where the value of the AE output M(t) at the time t when it is determined that there is a possibility that an abnormality occurs exceeds the second threshold Th2, it is determined that metal wear occurs in the screw 44, the housing 32, or the kneading disk 46. As described above, the first threshold Th1 and the second threshold Th2 are set to values suitable for carrying out the present embodiment.

In this way, by analyzing the value of the AE output M(t) itself, the occurrence of the abnormality of the twin-screw extrusion molding machine 30 can be reliably detected even in a case where the AE output M(t) includes a level variation. Note that how old the AE output to be referred to is, that is, the value of n (n=2, 3, . . . ) in Equation (5) can be set so that an evaluation experiment or the like is performed in advance to detect the AE wave W generated due to the abnormality.

Note that the inventors have confirmed that when metal wear occurs in the screw 44, the housing 32, or the kneading disk 46, the screw 44, the housing 32, or the kneading disk 46 is brought into contact with the inner wall of the housing 32, and thus an audible sound is observed. That is, in a case where the frequency component of the AE output M(t) is analyzed and a large amount of an audible frequency component is contained, it may be determined that metal wear occurs in the screw 44, the housing 32, or the kneading disk 46.

The abnormality detection device 50c performs the series of determinations described above on both the AE outputs M1(t) and M2(t). By measuring the difference between the time when the abnormality occurs, the part where the abnormality occurs can be specified as described in the second embodiment.

[Description of Hardware Configuration of Abnormality Detection Device]

Hereinafter, the abnormality detection device 50c for the twin-screw extrusion molding machine 30 according to the third embodiment will be described. Note that the hardware configuration of the abnormality detection device 50c is the same as that of the abnormality detection device 50b described in the second embodiment except that the storage unit 14 (see FIG. 9) of the abnormality detection device 50b includes a control program P3 (not illustrated) that manages the entire operation of the abnormality detection device 50c, and thus, description thereof is omitted.

[Description of Functional Configuration of Abnormality Detection Device]

Figure 14:
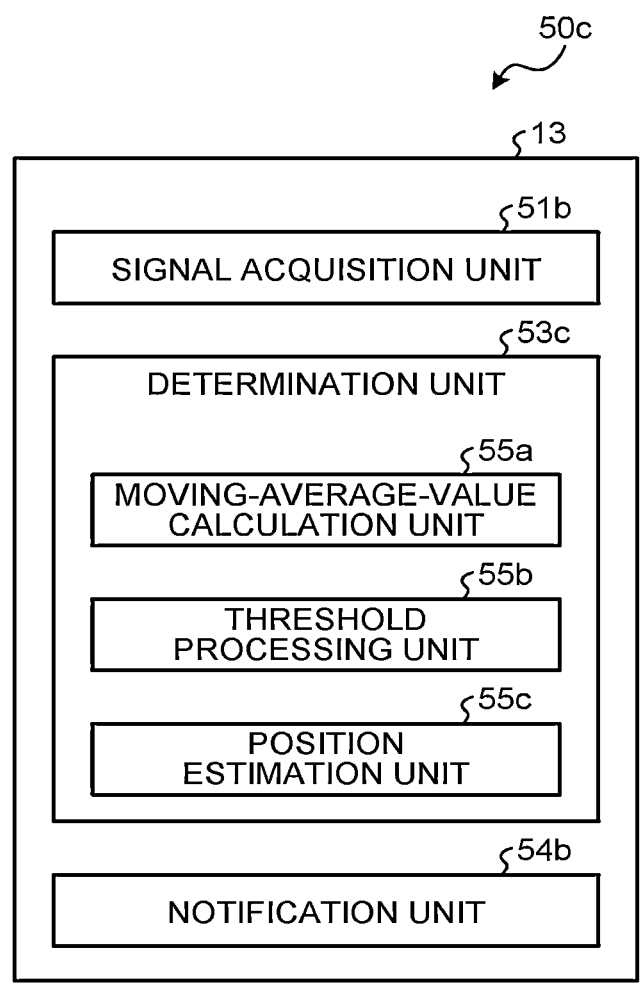
FIG. 14 is a functional configuration diagram of an abnormality detection device for a twin-screw extrusion molding machine according to a third embodiment.

FIG. 14 is a functional configuration diagram of an abnormality detection device for a twin-screw extrusion molding machine according to the third embodiment. The control unit 13 of the abnormality detection device 50c develops the control program P3 in the RAM 13c and operates the control program P3, thereby implementing the signal acquisition unit 51b, a determination unit 53c, and the notification unit 54b illustrated in FIG. 14 as functional units. The signal acquisition unit 51b and the notification unit 54b have the same functions as the respective units of the abnormality detection device 50b described in the second embodiment.

The determination unit 53c further includes a moving-average-value calculation unit 55a, a threshold processing unit 55b, and a position estimation unit 55c.

The moving-average-value calculation unit 55a calculates moving average values $MA(M1(t))$ and $MA(M2(t))$ for the AE outputs $M1(t)$ and $M2(t)$, respectively. The specific calculation method is as described above.

The threshold processing unit 55b performs a threshold process of determining whether or not a difference value E1 between the AE output $M1(t)$ and the moving average value $MA(M1(t))$ and a difference value E2 between the AE output $M2(t)$ and the moving average value $MA(M2(t))$ are larger than or equal to threshold values (the first threshold Th1 and the second threshold Th2). The specific content of the process is the same as the process performed by the determination unit 53a in the first embodiment.

The position estimation unit 55c estimates the part where an abnormality has occurred in the twin-screw extrusion molding machine 30 on the basis of the difference between the time when the difference values E1 and E2 first exceed the first threshold Th1 or the difference between the time when the difference values E1 and E2 first exceed the second threshold Th2 larger than the first threshold Th1. The specific estimation method is the same as the process performed by the determination unit 53b in the second embodiment.

[Description of Flow of Process Performed by Abnormality Detection Device]

Figure 15:
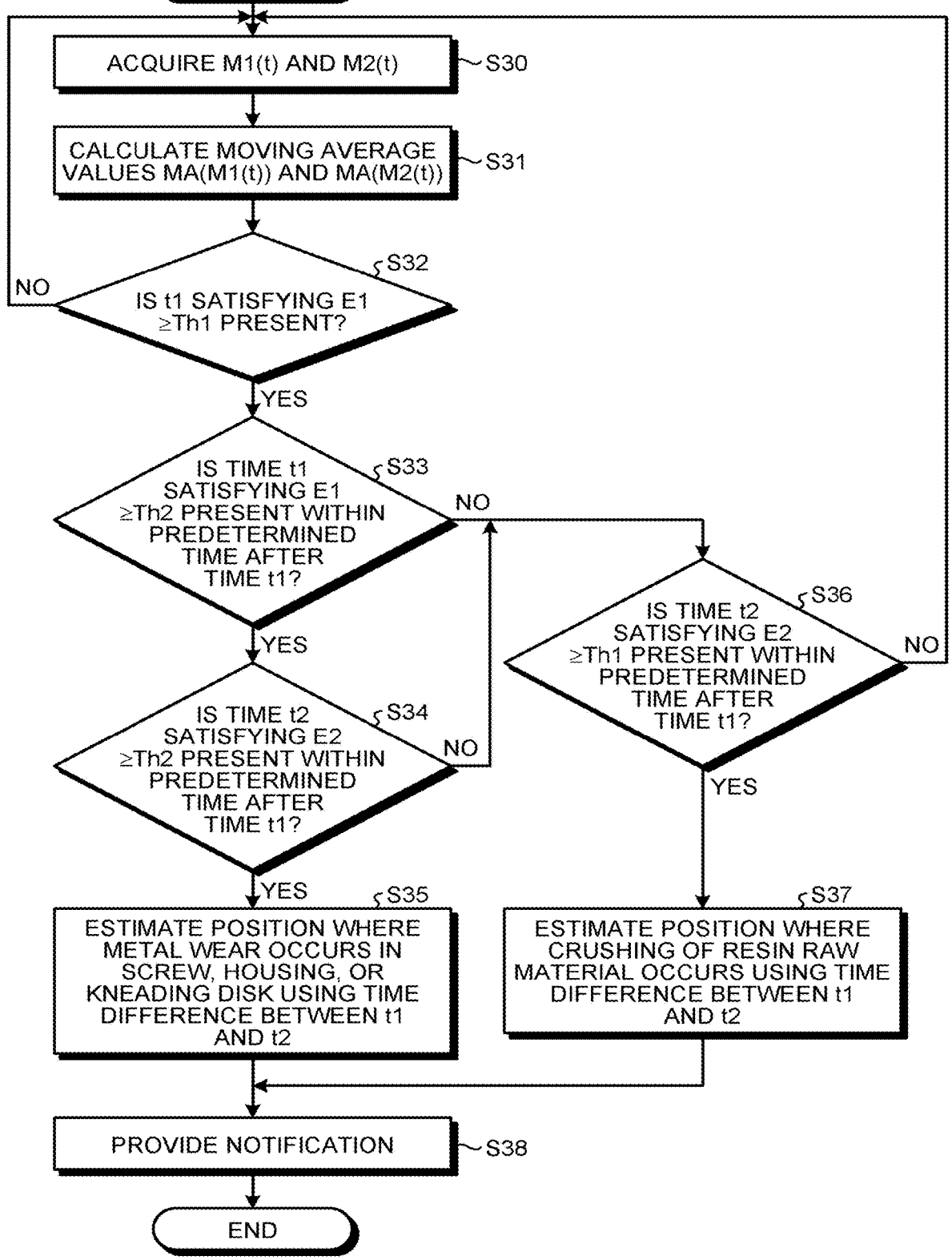
FIG. 15 is a flowchart illustrating an example of a flow of a process performed by the abnormality detection device for a twin-screw extrusion molding machine according to the third embodiment.

A flow of a process performed by the abnormality detection device 50c for the twin-screw extrusion molding machine 30 according to the third embodiment will be described with reference to FIG. 15. FIG. 15 is a flowchart illustrating an example of a flow of a process performed by the abnormality detection device for a twin-screw extrusion molding machine according to the third embodiment.

The signal acquisition unit 51b acquires the AE outputs $M1(t)$ and $M2(t)$ from the storage unit 14 (step S30). It is assumed that the abnormality detection device 50c processes the AE outputs $M1(t)$ and $M2(t)$ obtained in a predetermined time stored in the storage unit 14 in advance. Note that the outputs of the AE sensors 20x and 20y may be acquired in real time.

The moving-average-value calculation unit 55a calculates the moving average value $MA(M1(t))$ of the AE output $M1(t)$ and the moving average value $MA(M2(t))$ of the AE output $M2(t)$ (step S31).

The threshold processing unit 55b determines whether the time t1 when the difference value E1 between the AE output $M1(t)$ and the moving average value $MA(M1(t))$ is larger than or equal to the first threshold Th1 is present (step S32). When it is determined that the time t1 when the difference value E1 is larger than or equal to the first threshold Th1 is present (step S32: Yes), the process proceeds to step S33. On the other hand, when it is not determined that the time t1 when the difference value E1 is larger than or equal to the first threshold Th1 is present (step S32: No), the process returns to step S30, the time t is updated, and the process is continued for the acquired AE outputs $M1(t)$ and $M2(t)$.

When it is determined as Yes in step S32, the threshold processing unit 55b determines whether the time t1 when the difference value E1 between the AE output $M1(t)$ and the moving average value $MA(M1(t))$ is larger than or equal to the second threshold Th2 is present within a predetermined time after the time t1 (step S33). When it is determined that the time t1 when the difference value E1 is larger than or equal to the second threshold Th2 is present (step S33: Yes), the process proceeds to step S34. On the other hand, when it is not determined that the time t1 when the difference value E1 is larger than or equal to the second threshold Th2 is present (step S33: No), the process proceeds to step S36.

When it is determined as Yes in step S33, the threshold processing unit 55b determines whether the time t2 when the difference value E2 between the AE output $M2(t)$ and the moving average value $MA(M2(t))$ is larger than or equal to the second threshold Th2 is present within a predetermined time after the time t1 (step S34). When it is determined that the time t2 when the difference value E2 is larger than or equal to the second threshold Th2 is present (step S34: Yes), the process proceeds to step S35. On the other hand, when it is not determined that the time t2 when the difference value E2 is larger than or equal to the second threshold Th2 is present (step S34: No), the process proceeds to step S36.

When it is determined as Yes in step S34, the position estimation unit 55c estimates the position where metal wear occurs in the screw 44, the housing 32, or the kneading disk 46 using the time difference between the time t1 and the time t2 (step S35). Thereafter, the process proceeds to step S38.

When it is determined as No in step S33 or in step S34, the threshold processing unit 55b determines whether the time t2 when the difference value E2 between the AE output $M1(t)$ and the moving average value $MA(M2(t))$ is larger than or equal to the first threshold Th1 is present within the predetermined time after the time t1 (step S36). When it is determined that the time t2 when the difference value E2 is larger than or equal to the first threshold Th1 is present (step S36: Yes), the process proceeds to step S37. On the other hand, when it is not determined that the time t2 when the difference value E2 is larger than or equal to the first threshold Th1 is present (step S36: No), the process returns to step S30, the time t is updated, and the process is continued for the acquired AE outputs $M1(t)$ and $M2(t)$.

When it is determined as Yes in step S36, the position estimation unit 55c estimates the position where crushing of an unmelted resin raw material occurs using the time difference between the time t1 and the time t2 (step S37). Thereafter, the process proceeds to step S38.

Subsequent to step S35 or step S37, the notification unit 54b provides a notification that an abnormality occurs in the twin-screw extrusion molding machine 30 and a notification that indicates the position where the abnormality occurs (step S38). Thereafter, the abnormality detection device 50b ends the process of FIG. 15. Note that, in practice, the twin-screw extrusion molding machine 30 continuously operates, and thus the abnormality detection device 50c returns to step S30 again, acquires new AE outputs $M1(t)$ and $M2(t)$, and continues the process of FIG. 15.

As described above, in the abnormality detection device 50c of the third embodiment, when the twin-screw extrusion molding machine 30 (extrusion molding machine) that melts and kneads a fed resin raw material is in operation, the signal acquisition unit 51b (acquisition unit) acquires the AE output $M1(t)$ of the AE sensor 20x and the AE output $M2(t)$ of the AE sensor 20y, the AE sensors 20x and 20y being installed on the surface of the housing 32 of the twin-screw extrusion molding machine 30. The moving-average-value calculation unit 55a then calculates the moving average values $MA(M1(t))$ and $MA(M2(t))$ of the AE outputs $M1(t)$ and $M2(t)$. The threshold processing unit 55b then determines whether an abnormality occurs in the twin-screw extrusion molding machine 30 at the time t1 on the basis of the relationship between the difference value E1 (the variation amount of the AE output M1($t$)) between the AE output M1($t$) and the moving average value MA(M1($t$)), and the first threshold Th1 and the second threshold Th2. Furthermore, the threshold processing unit 55$b$ determines whether an abnormality occurs in the twin-screw extrusion molding machine 30 at the time t2 on the basis of the relationship between the difference value E2 (the variation amount of the AE output M2($t$)) between the AE output M2($t$) and the moving average value MA(M2($t$)), and the first threshold Th1 and the second threshold Th2. In a case where it is determined that an abnormality occurs at the time t1 and the time t2, the position estimation unit 55$c$ estimates the part where the abnormality occurs in the twin-screw extrusion molding machine 30 on the basis of the time difference between the time t1 and the time t2. As a result, the occurrence of the abnormality in the twin-screw extrusion molding machine 30 during the continuous operation can be reliably detected, and the position where the abnormality occurs can be estimated. In particular, even in a case where the level variation due to the state change of the twin-screw extrusion molding machine 30 occurs, it is possible to reliably detect the occurrence of the abnormality in the twin-screw extrusion molding machine 30, and thus, it is possible to detect an abnormality in a state where the twin-screw extrusion molding machine 30 is continuously operated for a long period of time.

Furthermore, in the abnormality detection device 50$c$ of the third embodiment, the threshold processing unit 55$b$ (the determination unit 53$c$) may determine that an abnormality occurs at the time t in a case where the difference value (M(t)−M(t−n∆t)) between the AE output M(t) at the time t and the AE output M(t−n∆t) in the past by a predetermined time n∆t (n=1, 2, . . . ) is larger than the predetermined value S. Then, in a case where the AE output M(t) at the time t when it is determined that an abnormality occurs exceeds the first threshold Th1 and does not exceed the second threshold Th2, the threshold processing unit 55$b$ may determine that crushing of the resin raw material occurs at the time t. Furthermore, in a case where the AE output M(t) at the time t when it is determined that an abnormality occurs exceeds the second threshold Th2, the threshold processing unit 55$b$ may determine that metal wear occurs in the screw 44, the housing 32 (barrel), or the kneading disk 46. Consequently, even in a case where the level variation due to the state change of the twin-screw extrusion molding machine 30 occurs, it is possible to reliably detect the occurrence of the abnormality in the twin-screw extrusion molding machine 30, and thus, it is possible to detect an abnormality in a state where the twin-screw extrusion molding machine 30 is continuously operated for a long period of time.

Fourth Embodiment

In the first to third embodiments described above, in a case where crushing of an unmelted resin raw material and metal wear of the screw 44, the housing 32, or the kneading disk occur at the same time, both cannot be identified and detected. That is, it is possible to detect metal wear of the screw 44, the housing 32, or the kneading disk with a large absolute value of the AE output M(t), but a signal indicating that the occurrence of crushing of the resin raw material with a small absolute value of the AE output M(t) is buried in the AE output M(t) obtained when the metal wear occurs.

A fourth embodiment of the present disclosure is an example of an abnormality detection device 50$d$ for a twin-screw extrusion molding machine capable of identifying and detecting crushing of an unmelted resin raw material and metal wear when the crushing and the metal wear occur at the same time.

Note that the hardware configuration of the abnormality detection device 50$d$ is the same as that of the abnormality detection device 50$a$ described in the first embodiment except that the storage unit 14 (see FIG. 6) of the abnormality detection device 50$a$ includes a control program P4 (not illustrated) that manages the entire operation of the abnormality detection device 50$d$, and thus, description thereof is omitted.

Figure 16:
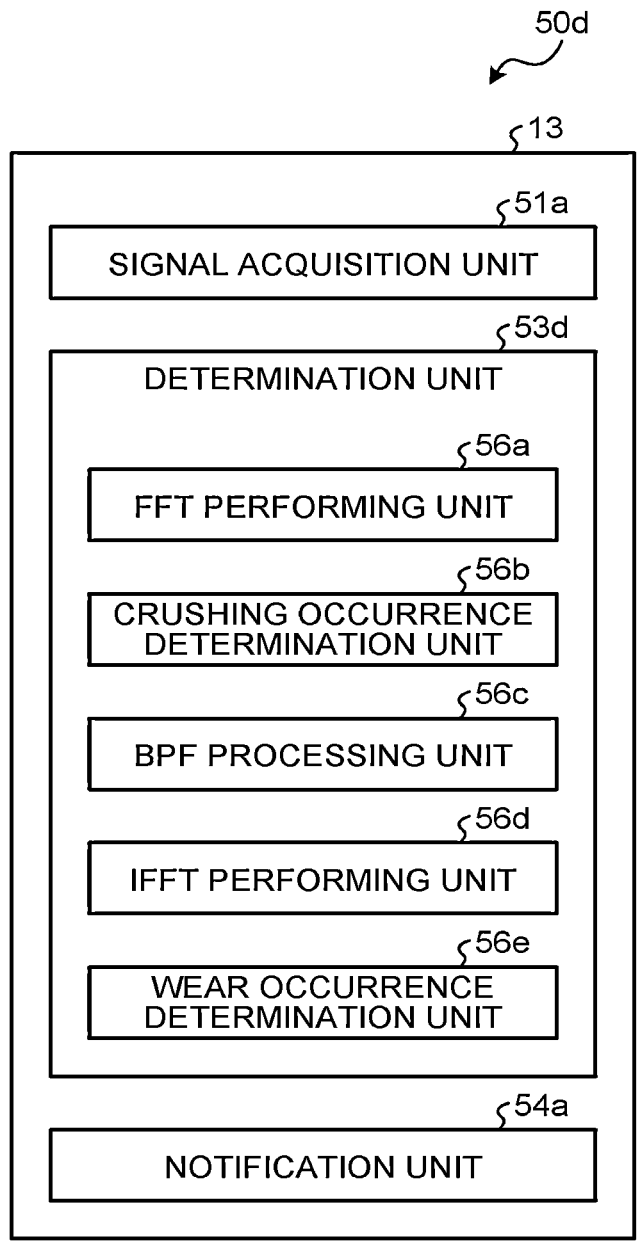
FIG. 16 is a functional configuration diagram of an abnormality detection device for a twin-screw extrusion molding machine according to a fourth embodiment.

First, a functional configuration of the abnormality detection device 50$d$ for the twin-screw extrusion molding machine 30 according to the fourth embodiment will be described with reference to FIG. 16. FIG. 16 is a functional configuration diagram of an abnormality detection device for a twin-screw extrusion molding machine according to the fourth embodiment.

The control unit 13 of the abnormality detection device 50$d$ develops the control program P4 in the RAM 13$c$ and operates the control program P4, thereby implementing the signal acquisition unit 51$a$, a determination unit 53$d$, and the notification unit 54$a$ illustrated in FIG. 16 as functional units. The signal acquisition unit 51$a$ and the notification unit 54$a$ have the same functions as the respective unis of the abnormality detection device 50$a$ described in the first embodiment.

The determination unit 53$d$ further includes an FFT performing unit 56$a$, a crushing occurrence determination unit 56$b$, a BPF processing unit 56$c$, an IFFT performing unit 56$d$, and a wear occurrence determination unit 56$e$.

The FFT performing unit 56$a$ performs a discrete Fourier transform on the AE output M(t) to calculate a power spectrum M(f). Specifically, the FFT performing unit 56$a$ first performs a discrete Fourier transform on a finite length waveform to apply a window function such as a Gaussian window or a Hamming window to the AE output M(t) in order to suppress generation of a frequency component that is not actually present at the position where waveforms are concatenated as much as possible. The FFT performing unit 56$a$ then performs a fast Fourier transform (FFT) on the AE output M(t) having the window function applied thereto. Note that the FFT performing unit 56$a$ is an example of a calculation unit in the present disclosure.

The crushing occurrence determination unit 56$b$ determines whether crushing of the resin raw material occurs on the basis of the power spectrum M(f). Specifically, in a case where the power in a predetermined frequency band in the power spectrum M (f) exceeds a third threshold Th3, the crushing occurrence determination unit 56$b$ determines that crushing of the unmelted resin raw material occurs. Note that the crushing occurrence determination unit 56$b$ is an example of a first determination unit in the present disclosure. Note that the predetermined frequency band and the third threshold Th3 are set in accordance with, for example, the type of the resin raw material and the operating conditions of the twin-screw extrusion molding machine 30.

The BPF processing unit 56$c$ applies a band pass filter that cuts only a predetermined frequency band to the power spectrum M(f). Note that the BPF processing unit 56$c$ is an example of a subtractor in the present disclosure.

The IFFT performing unit 56$d$ performs an inverse discrete Fourier transform on a power spectrum N(f) obtained by subtracting the power in a predetermined frequency band from the power spectrum M(f) to calculate the AE output N(t) that is a time signal.

The wear occurrence determination unit 56e determines whether metal wear occurs with respect to the AE output N(t). Specifically, in a case where the AE output N(t) exceeds the second threshold Th2, the wear occurrence determination unit 56e determines that metal wear occurs in a screw that conveys the resin raw material from upstream to downstream, a housing (barrel), or a kneading disk that kneads the resin raw material. Note that the wear occurrence determination unit 56e is an example of a second determination unit in the present disclosure.

[Description of Abnormality Detection Method]

Figure 17:
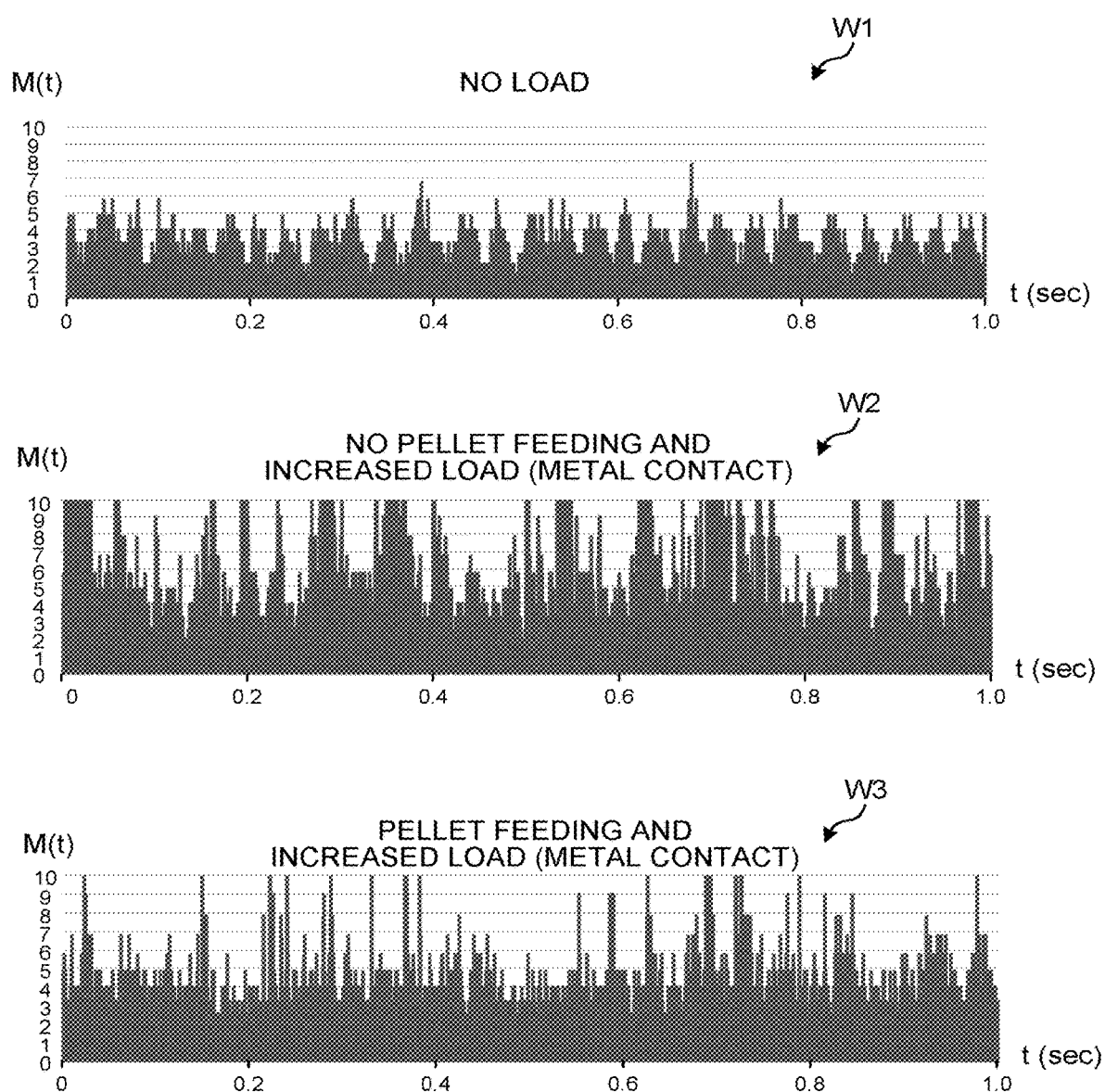
FIG. 17 is a diagram illustrating an example of an AE output that is output from a twin-screw extrusion machine.
Figure 18:
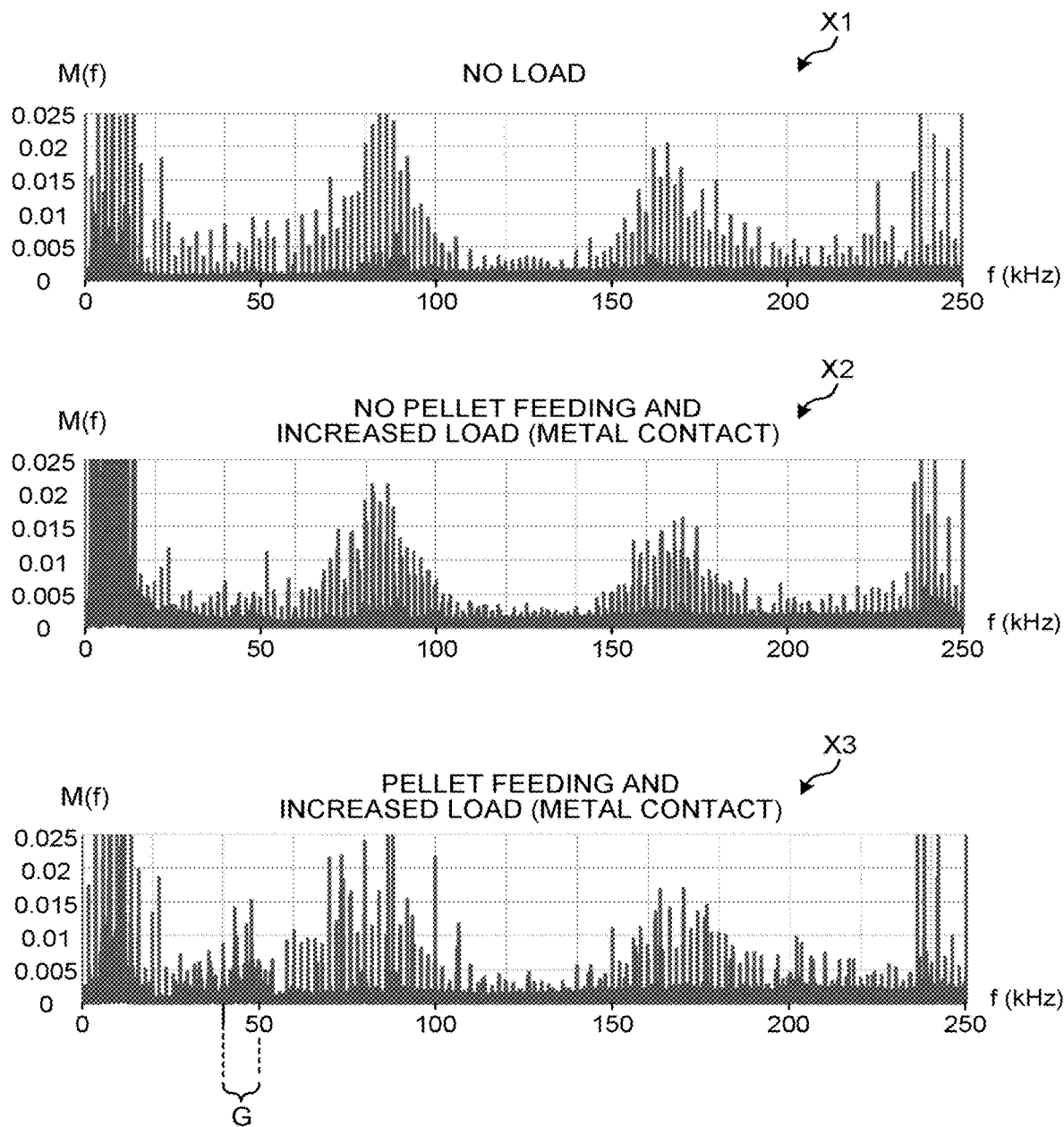
FIG. 18 is a diagram illustrating an example of a power spectrum of each AE output illustrated in FIG. 17.

A specific example of the AE output M(t) output from the twin-screw extrusion molding machine 30 will be described with reference to FIGS. 17 and 18. FIG. 17 is a diagram illustrating an example of an AE output that is output from a twin-screw extrusion molding machine. FIG. 18 is a diagram illustrating an example of a power spectrum of each AE output illustrated in FIG. 17.

The inventor of the present disclosure obtained AE output waveforms W1, W2, and W3 illustrated in FIG. 17 by observing an AE output M(t) that is actually output by the twin-screw extrusion molding machine 30. The AE output waveform W1 is an example of the AE output obtained in a case where resin pellets are not fed and metal wear does not occur. The AE output waveform W2 is an example of the AE output obtained in a case where resin pellets are not fed and metal wear occurs. The AE output waveform W3 is an example of the AE output obtained in a case where resin pellets are fed and thus crushing occurs, and metal wear also occurs.

Note that FIG. 17 illustrates a result of measuring the AE output M(t) every 20 μsec at about 50,000 points (for about one sec).

When each AE output waveform in FIG. 17 is subjected to a discrete Fourier transform by FFT, power spectra X1, X2, and X3 illustrated in FIG. 18 are obtained.

From the comparison between the power spectrum X3 and the power spectra X1 and X2 in FIG. 18, the inventor of the present disclosure has found that a power spectrum in a specific frequency band appears when crushing of the resin raw material occurs. Specifically, it has been found that the power spectrum X3 in FIG. 18 has a smaller peak in a frequency band of 45 kHz±5 kHz (a frequency section G in FIG. 18) as compared with the power spectra X1 and X2.

The crushing occurrence determination unit 56b determines that crushing of the resin raw material occurs in a case where a power spectrum satisfying M(f)≥Th3 with respect to the third threshold Th3 is present in a predetermined frequency band of 45 kHz±5 kHz of the power spectrum X3. Note that since the predetermined frequency band and the third threshold Th3 vary depending on the material of the resin raw material to be used, the operating conditions of the twin-screw extrusion molding machine 30, and the like as described above, the predetermined frequency band and the third threshold Th3 are set to appropriate values after confirming the characteristics of the signal waveform by an evaluation experiment or the like performed in advance.

The BPF processing unit 56c applies a band pass filter that cuts a power spectrum in a frequency band of 45 kHz±5 kHz to the power spectrum X3. It is assumed that the power spectrum N(f) is obtained by the function of the BPF processing unit 56c.

The IFFT performing unit 56d performs an inverse discrete Fourier transform on the power spectrum N(f). As a result, the AE output N(t) as a time signal, from which an AE wave generated due to the occurrence of crushing of the resin raw material is removed, is obtained.

As described in the first embodiment, the wear occurrence determination unit 56e determines whether the AE output N(t) exceeds the second threshold Th2. Then, in a case where the AE output N(t) exceeds the second threshold Th2, the wear occurrence determination unit 56e determines that metal wear occurs.

[Description of Flow of Process Performed by Abnormality Detection Device]

Figure 19:
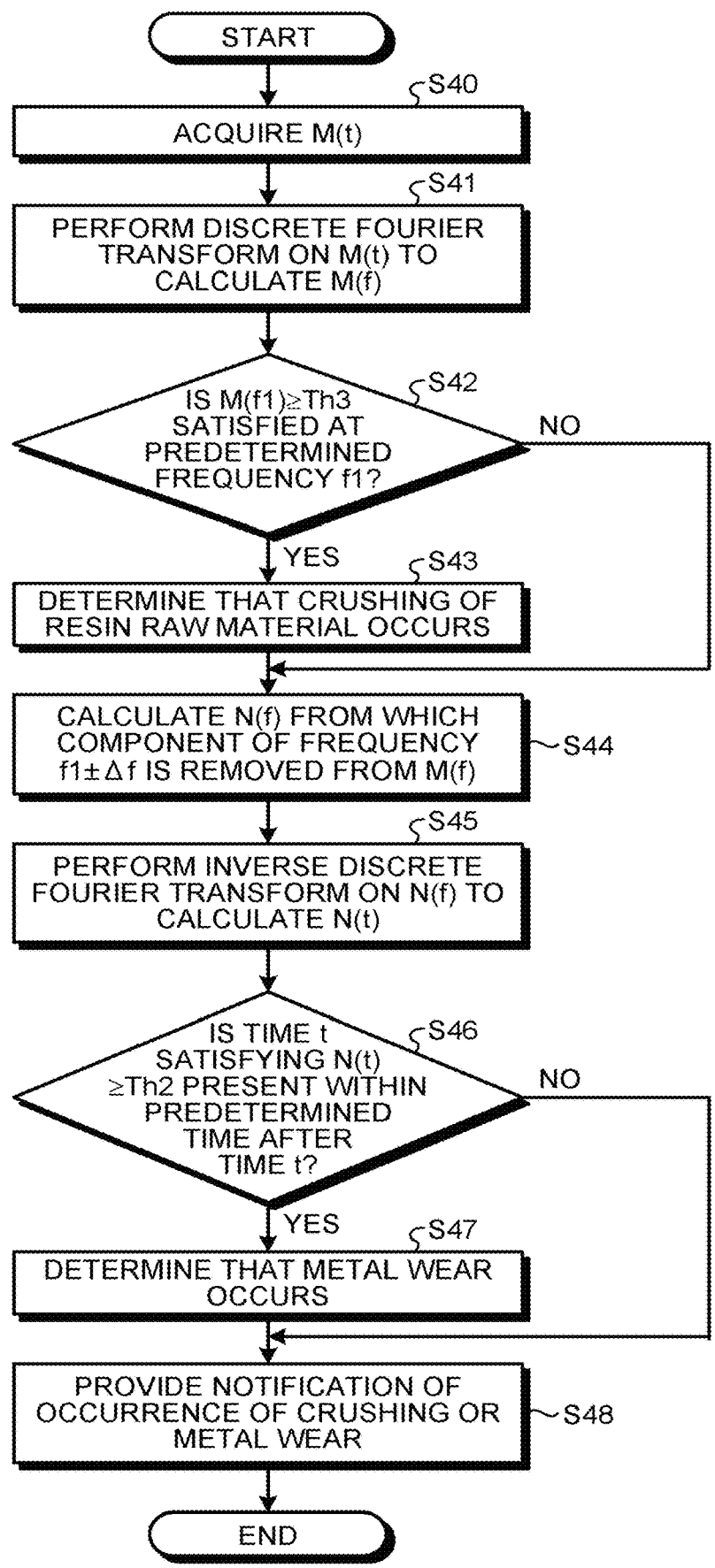
FIG. 19 is a flowchart illustrating an example of a flow of a process performed by the abnormality detection device for a twin-screw extrusion molding machine according to the fourth embodiment.

A flow of a process performed by the abnormality detection device 50d for the twin-screw extrusion molding machine 30 according to the fourth embodiment will be described with reference to FIG. 19. FIG. 19 is a flowchart illustrating an example of a flow of a process performed by an abnormality detection device for a twin-screw extrusion molding machine according to the fourth embodiment.

The signal acquisition unit 51a acquires the AE output M(t) from the storage unit 14 (step S40). Note that the AE output M(t) acquired is a waveform corresponding to the number of sampling points that can be subjected to a discrete Fourier transform in step S41.

The FFT performing unit 56a performs a discrete Fourier transform on the AE output M(t) to calculate a power spectrum M(f) (step S41). Note that the discrete Fourier transform is performed by FFT.

The crushing occurrence determination unit 56b determines whether M(f1)≥Th3 is satisfied at a predetermined frequency f1 (more precisely, a frequency satisfying M(f1)≥Th3 is present in a predetermined frequency band f1±Δf) (step S42). When it is determined that M(f1)≥Th3 is satisfied at the predetermined frequency f1 (step S42: Yes), the process proceeds to step S43. On the other hand, when it is not determined that M(f1)≥Th3 is satisfied at the predetermined frequency f1 (step S42: No), the process proceeds to step S44.

When it is determined as Yes in step S42, the crushing occurrence determination unit 56b determines that crushing of the resin raw material occurs (step S43).

When it is determined as No in step S42 or subsequent to step S43, the BPF processing unit 56c applies a band-pass filter that removes a frequency band indicating the occurrence of crushing to the power spectrum M(f) to calculate the power spectrum N(f) (step S44). Specifically, the BPF processing unit 56c removes a frequency region of f1±Δf where the center frequency indicating the occurrence of crushing is denoted by f1.

The IFFT performing unit 56d performs a discrete Fourier transform on the power spectrum N(f) to calculate an AE output N(t) (step S45).

The wear occurrence determination unit 56e determines whether a time t satisfying N(t)≥Th2 is present within a predetermined time to after the time t (step S46). When it is determined that the time t satisfying N(t)≥Th2 is present (step S46: Yes), the process proceeds to step S47. On the other hand, when it is not determined that the time t satisfying N(t)≥Th2 is present (step S46: No), the process proceeds to step S48.

When it is determined as Yes in step S46, the wear occurrence determination unit 56e determines that metal wear occurs in the screw 44, the housing 32, or the kneading disk 46 of the twin-screw extrusion molding machine 30 (step S47).

When it is determined as No in step S46 or subsequent to step S47, the notification unit 54a notifies the occurrence of crushing or wear (step S48). Note that since the notification unit 54a provides a notification on the basis of the determinations made in step S43 and step S47, the notification unit 54a identifies and notifies the occurrence of crushing and the occurrence of metal wear. Furthermore, the notification unit 54a notifies that both crushing and metal wear occur.

Note that FIG. 19 illustrates an example in which abnormality detection is performed on one AE output M(t) for simple description, but in practice, the abnormality detection device 50d repeatedly performs the process of FIG. 19 every time the AE output M(t) in the time section shifted by the predetermined time Δt is acquired while adding the predetermined time Δt to the time t at the head of the AE output.

As described above, in the abnormality detection device 50d of the fourth embodiment, when the twin-screw extrusion molding machine 30 that melts and kneads a fed resin raw material is in operation, the signal acquisition unit 51a (acquisition unit) acquires the AE output M(t) output from the AE sensor 20 installed on the surface of the housing of the twin-screw extrusion molding machine 30. The FFT performing unit 56a (calculation unit) then calculates the power spectrum M(f) for each frequency of the AE output M(t). Next, in a case where the power in the predetermined frequency band f1±Δf in the power spectrum M(f) calculated by the FFT performing unit 56a exceeds the third threshold, the crushing occurrence determination unit 56b (first determination unit) determines that crushing of an unmelted resin raw material occurs. The BPF processing unit 56c (subtractor) calculates the power spectrum N(f) obtained by subtracting the power spectrum in the predetermined frequency band f1±Δf from the power spectrum M(f) for each frequency calculated by the FFT performing unit 56a. The IFFT performing unit 56d (conversion unit) converts the power spectrum N(f) calculated by the BPF processing unit 56c into a time signal. In a case where the time signal calculated by the IFFT performing unit 56d exceeds the second threshold Th2, the wear occurrence determination unit 56e (second determination unit) determines that metal wear occurs in the screw 44, the housing 32 (barrel), or the kneading disk 46 of the twin-screw extrusion molding machine 30.

Consequently, even in a case where crushing of the resin material and metal wear occur at the same time, it is possible to identify and detect the occurrence of the crushing and the metal wear.

First Modification of Fourth Embodiment

In the fourth embodiment, with respect to the power spectrum M(f) of the AE output M(t), the signal indicating that crushing of the unmelted resin raw material occurs is detected, the power spectrum N(f) from which the component of the signal is removed is converted into a time signal, and then whether information indicating that metal wear occurs is included in the converted time signal is determined. However, the order of the determination may be changed.

That is, with respect to the power spectrum M(f) of the AE output M(t), the abnormality detection device 50d may detect a signal indicating that metal wear occurs, convert the power spectrum N(f) from which the component of the signal is removed into a time signal, and then determine whether information indicating that crushing of the unmelted resin raw material occurs is included in the converted time signal.

For example, in FIG. 18, the occurrence of metal wear can be determined by determining whether a signal in a predetermined frequency band in the power spectrum M(f), for example, a signal near a frequency of 10 kHz or near a frequency of 200 kHz exceeds a predetermined threshold. Note that since a specific frequency band and a specific predetermined threshold vary depending on the material of the resin raw material to be used, the operating conditions of the twin-screw extrusion molding machine 30, and the like, the frequency band and the predetermined threshold are set to appropriate values after confirming the characteristics of the signal waveform by an evaluation experiment or the like performed in advance.

Figure 20:
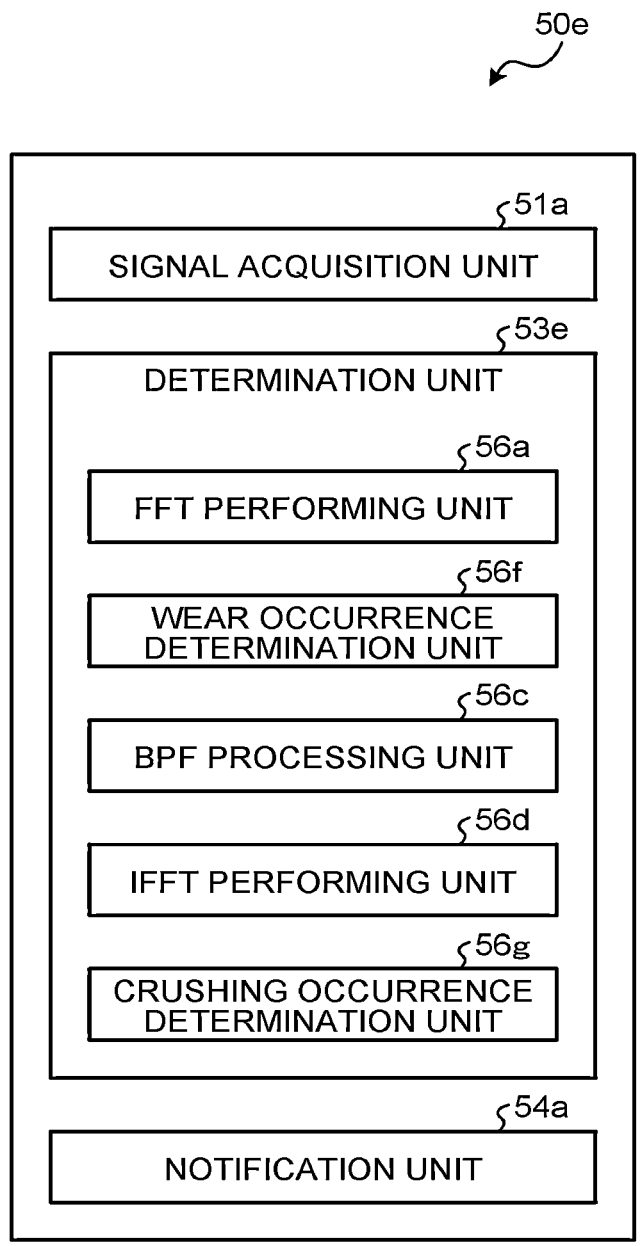
FIG. 20 is a functional configuration diagram of an abnormality detection device for a twin-screw extrusion molding machine according to a first modification of the fourth embodiment.

FIG. 20 is a functional configuration diagram of an abnormality detection device for a twin-screw extrusion molding machine according to a first modification of the fourth embodiment.

An abnormality detection device 50e for the twin-screw extrusion molding machine 30 includes the signal acquisition unit 51a, a determination unit 53e, and the notification unit 54a. The functions of the signal acquisition unit 51a and the notification unit 54a are the same as those of the abnormality detection device 50d.

The determination unit 53e further includes the FFT performing unit 56a, a wear occurrence determination unit 56f, the BPF processing unit 56c, the IFFT performing unit 56d, and a crushing occurrence determination unit 56g.

The wear occurrence determination unit 56f determines whether metal wear occurs on the basis of the power spectrum M(f). Specifically, in a case where the power in a predetermined frequency band of f2±Δf in the power spectrum M(f) exceeds a fourth threshold Th4, the wear occurrence determination unit 56f determines that metal wear occurs. Note that the wear occurrence determination unit 56f is an example of a third determination unit in the present disclosure.

The BPF processing unit 56c applies a bandpass filter that cuts a power spectrum in the frequency band f2±Δf from the power spectrum M(f). It is assumed that the power spectrum N(f) is obtained by the function of the BPF processing unit 56c.

The IFFT performing unit 56d performs an inverse discrete Fourier transform on the power spectrum N(f). As a result, the AE output N(t) as a time signal, from which an AE wave generated due to the occurrence of metal wear is removed, is obtained.

The crushing occurrence determination unit 56g determines whether crushing of the resin raw material occurs with respect to the AE output N(t). Specifically, the crushing occurrence determination unit 56g determines that crushing of the resin raw material occurs in a case where the AE output N(t) exceeds the first threshold Th1. Note that the crushing occurrence determination unit 56g is an example of a fourth determination unit in the present disclosure.

The flow of a process performed by the abnormality detection device 50e is substantially the same as the flow of the process performed by the abnormality detection device 50d (see FIG. 19). The difference is that it is determined whether metal wear occurs on the basis of the power spectrum M(f), and then it is determined whether crushing of the resin raw material occurs. Specifically, the power spectrum N(f) obtained by cutting a power spectrum in a frequency band corresponding to metal wear is calculated from the power spectrum M(f), and the method described in the first embodiment is applied to a waveform obtained by converting the power spectrum N(f) into a time signal to determine whether crushing of the resin raw material occurs.

As described above, in the abnormality detection device 50d of the first modification of the fourth embodiment, when the twin-screw extrusion molding machine 30 that melts and kneads a fed resin raw material is in operation, the signal acquisition unit 51*a* (acquisition unit) acquires the AE output M(t) output from the AE sensor 20 installed on the surface of the housing of the twin-screw extrusion molding machine 30. The FFT performing unit 56*a* (calculation unit) then calculates the power spectrum M(f) for each frequency of the AE output M(t). In a case where the power in a predetermined frequency band in the power spectrum M(f) calculated by the FFT performing unit 56*a* exceeds the fourth threshold Th4, the wear occurrence determination unit 56*f* (third determination unit) then determines that metal wear occurs in the screw 44, the housing 32 (barrel), or the kneading disk 46 of the twin-screw extrusion molding machine 30. The BPF processing unit 56*c* (subtractor) calculates the power spectrum N(f) obtained by subtracting the power spectrum in the predetermined frequency band corresponding to metal wear from the power spectrum M(f) for each frequency calculated by the FFT performing unit 56*a*. The IFFT performing unit 56*d* (conversion unit) converts the power spectrum N(f) calculated by the BPF processing unit 56*c* into a time signal. The crushing occurrence determination unit 56*g* (fourth determination unit) determines that crushing of the resin raw material occurs in a case where the time signal calculated by the IFFT performing unit 56*d* exceeds the first threshold Th1.

Consequently, even in a case where crushing of the resin material and metal wear occur at the same time, it is possible to identify and detect the occurrence of the crushing and the metal wear.

Second Modification of Fourth Embodiment

An abnormality detection device 50*f* according to a second modification of the fourth embodiment determines whether or not crushing of a resin raw material occurs and whether or not metal wear occurs on the basis of only the power spectrum M(f).

Figure 21:
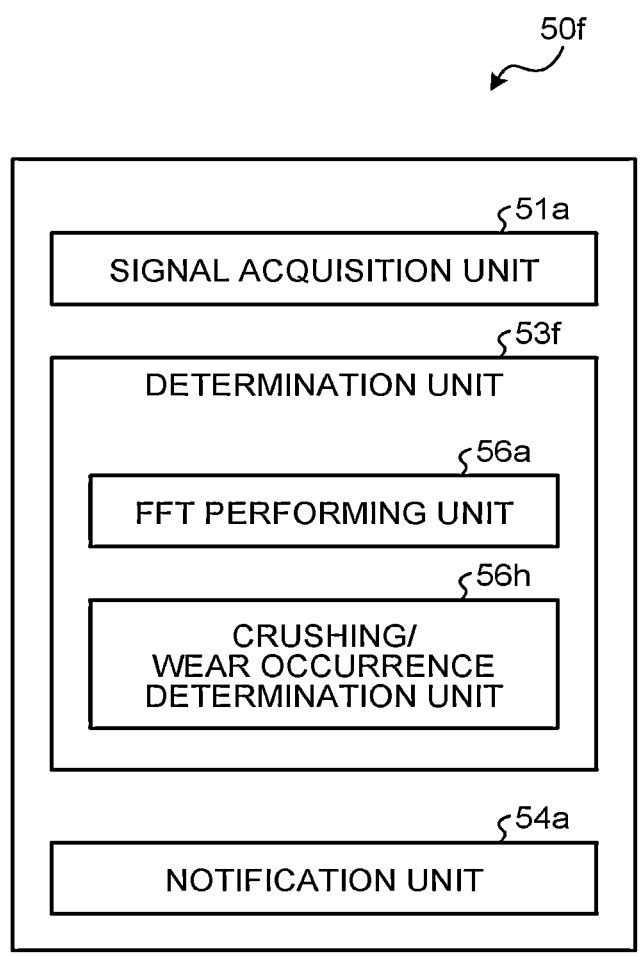
FIG. 21 is a functional configuration diagram of an abnormality detection device for a twin-screw extrusion molding machine according to a second modification of the fourth embodiment.

FIG. 21 is a functional configuration diagram of an abnormality detection device for a twin-screw extrusion molding machine according to the second modification of the fourth embodiment.

The abnormality detection device 50*f* for the twin-screw extrusion molding machine 30 includes the signal acquisition unit 51*a*, a determination unit 53*f*, and the notification unit 54*a*. The functions of the signal acquisition unit 51*a* and the notification unit 54*a* are the same as those of the abnormality detection device 50*d*.

The determination unit 53*f* further includes the FFT performing unit 56*a* and a crushing/wear occurrence determination unit 56*h*. Note that the function of the FFT performing unit 56*a* is the same as that of the abnormality detection device 50*d*.

The crushing/wear occurrence determination unit 56*h* has a function of the crushing occurrence determination unit 56*b* included in the abnormality detection device 50*d* and a function of the wear occurrence determination unit 56*f* included in the abnormality detection device 50*e*. Note that the crushing/wear occurrence determination unit 56*h* is an example of a fifth determination unit in the present disclosure.

In the abnormality detection device 50*f*, the crushing/wear occurrence determination unit 56*h* determines that crushing of an unmelted resin raw material occurs in a case where the power in a predetermined frequency band out of the power for each frequency of the AE output M(t) calculated by the FFT performing unit 56*a* exceeds the third threshold Th3. In addition, the crushing/wear occurrence determination unit 56*h* determines that metal wear occurs in a case where the power in a predetermined frequency band different from the predetermined frequency band out of the power for each frequency of the AE output M(t) exceeds the fourth threshold Th4.

Figure 22:
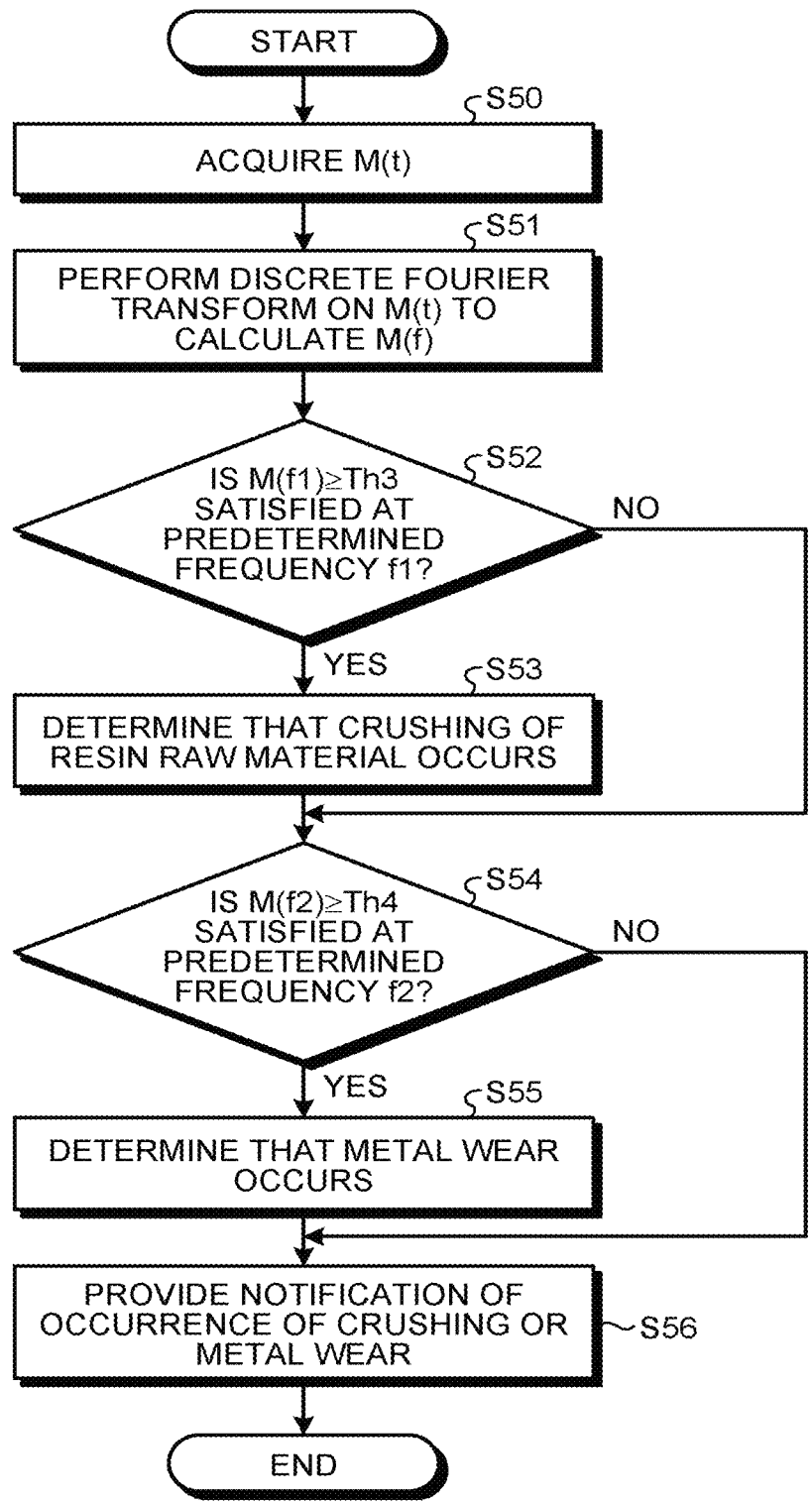
FIG. 22 is a flowchart illustrating an example of a flow of a process performed by the abnormality detection device for a twin-screw extrusion molding machine according to the second modification of the fourth embodiment.

FIG. 22 is a flowchart illustrating an example of a flow of a process performed by the abnormality detection device for a twin-screw extrusion molding machine according to the second modification of the fourth embodiment.

The signal acquisition unit 51*a* acquires the AE output M(t) from the storage unit 14 (step S50). Note that the AE output M(t) acquired is a waveform corresponding to the number of sampling points that can be subjected to a discrete Fourier transform in step S51.

The FFT performing unit 56*a* performs a discrete Fourier transform on the AE output M(t) to calculate the power spectrum M(f) (step S51). Note that the discrete Fourier transform is performed by FFT.

The crushing/wear occurrence determination unit 56*h* determines whether $M(f1) \geq Th3$ is satisfied at the predetermined frequency f1 (more precisely, a frequency satisfying $M(f1) \geq Th3$ is present in the predetermined frequency band $f1 \pm \Delta f$) (step S52). When it is determined that $M(f1) \geq Th3$ is satisfied at the predetermined frequency f1 (step S52: Yes), the process proceeds to step S53. On the other hand, when it is not determined that $M(f1) \geq Th3$ is satisfied at the predetermined frequency f1 (step S52: No), the process proceeds to step S54.

When it is determined as Yes in step S52, the crushing/wear occurrence determination unit 56*h* determines that crushing of a resin raw material occurs (step S53).

When it is determined as No in step S52 or subsequent to step S53, the crushing/wear occurrence determination unit 56*h* determines whether $M(f2) \geq Th4$ is satisfied at the predetermined frequency f2 (more precisely, a frequency satisfying $M(f2) \geq Th4$ is present in the predetermined frequency band $f2 \pm \Delta f$) (step S54). Here, the predetermined frequency f2 is a frequency different from the predetermined frequency f1 in step S52. When it is determined that $M(f2) \geq Th4$ is satisfied at the predetermined frequency f2 (step S54: Yes), the process proceeds to step S55. On the other hand, when it is not determined that $M(f2) \geq Th4$ is satisfied at the predetermined frequency f2 (step S54: No), the process proceeds to step S56.

When it is determined as Yes in step S54, the crushing/wear occurrence determination unit 56*h* determines that metal wear occurs (step S55).

When it is determined as No in step S54 or subsequent to step S55, the notification unit 54*a* notifies the occurrence of crushing or metal wear (step S56). Note that since the notification unit 54*a* provides a notification on the basis of the determinations made in step S53 and step S55, the notification unit 54*a* identifies and notifies the occurrence of crushing and the occurrence of metal wear. Furthermore, the notification unit 54*a* notifies that both crushing and metal wear occur.

As described above, in the abnormality detection device 50*f* of the second modification of the fourth embodiment, when the twin-screw extrusion molding machine 30 that melts and kneads a fed resin raw material is in operation, the signal acquisition unit 51*a* (acquisition unit) acquires the AE output M(t) output from the AE sensor 20 installed on the surface of the housing of the twin-screw extrusion molding machine 30. The FFT performing unit 56*a* (calculation unit) then calculates the power spectrum M(f) for each frequency of the AE output M(t). In a case where the power in the predetermined frequency band $f1 \pm \Delta f$ in the power spectrum M(f) calculated by the FFT performing unit 56*a* exceeds the third threshold, the crushing/wear occurrence determination unit 56*h* (fifth determination unit) determines that crushing of an unmelted resin raw material occurs. Furthermore, in a case where the power in the predetermined frequency band f2±Δf in the power spectrum M(f) calculated by the FFT performing unit 56*a* exceeds the fourth threshold Th4, the crushing/wear occurrence determination unit 56*h* determines that metal wear occurs in the screw 44, the housing 32 (barrel), or the kneading disk 46 of the twin-screw extrusion molding machine 30.

Consequently, even in a case where crushing of the resin material and metal wear occur at the same time, it is possible to identify and detect the occurrence of the crushing and the metal wear.

The invention claimed is:

1. An abnormality detection device for an extrusion molding machine, comprising:
   an acquisition unit that acquires an elastic wave emitted inside the extrusion molding machine according to the operating state of the extrusion molding machine by an acoustic emission (AE) sensor, installed on a surface of a housing of the extrusion molding machine that melts and kneads a fed resin raw material when the extrusion molding machine is in operation;
   a determination unit that determines whether an abnormality occurs in the extrusion molding machine, based on a relationship between the output of the AE sensor acquired by the acquisition unit and a threshold value related to the output magnitude of the AE sensor; and
   a control unit that controls an operating status of the extrusion molding machine based on a judgement of the determination unit, wherein
   the threshold includes a first threshold and a second threshold that is larger than the first threshold,
   when the determination unit determines that crushing of an unmelted resin raw material occurs in a case where the output of the AE sensor acquired by the acquisition unit exceeds the first threshold and does not exceed the second threshold, the control unit increases a set temperature of a heater to promote melting of the resin raw material, and
   when the determination unit determines that wear of a screw that conveys the resin raw material from upstream to downstream, a barrel, or a kneading disk that kneads the resin raw material occurs in a case where the output of the AE sensor acquired by the acquisition unit exceeds the second threshold, the control unit reduces an amount of the resin to be fed or increases the set temperature of the heater to promote melting of the resin raw material.

2. An abnormality detection device for an extrusion molding machine comprising:
   an acquisition unit that acquires a time signal of an elastic wave emitted according to the operating state of an extrusion molding machine that melts and kneads a fed resin raw material by an acoustic emission (AE) sensor installed on a surface of a housing of the extrusion molding machine;
   a calculation unit that calculates power for each frequency of the output of the AE sensor;
   a first determination unit that determines that crushing of an unmelted resin raw material occurs in a case where power in a predetermined frequency band out of the power for each frequency calculated by the calculation unit exceeds a first threshold;
   a subtractor that subtracts the power in the predetermined frequency band from the power for each frequency;
   a conversion unit that converts a subtraction result of the subtractor into a time signal;
   a second determination unit that determines that wear of a screw that conveys the resin raw material from upstream to downstream, a barrel, or a kneading disk that kneads the resin raw material occurs in a case where the time signal converted by the conversion unit exceeds a second threshold; and
   a control unit that reduces an amount of the resin to be fed or increases a set temperature of a heater to promote melting of the resin raw material when the second determination unit determines that wear of a screw that conveys the resin raw material from upstream to downstream, a barrel, or a kneading disk that kneads the resin raw material occurs.

3. An abnormality detection device for an extrusion molding machine comprising:
   an acquisition unit that acquires a time signal of an elastic wave emitted according to the operating state of an extrusion molding machine that melts and kneads a fed resin raw material by an acoustic emission (AE) sensor installed on a surface of a housing of the extrusion molding machine;
   a calculation unit that calculates power for each frequency of the output of the AE sensor;
   a first determination unit that determines that wear of a screw that conveys a resin raw material from upstream to downstream, a barrel, or a kneading disk that kneads the resin raw material occurs in a case where power in a predetermined frequency band out of the power for each frequency calculated by the calculation unit exceeds a first threshold;
   a subtractor that subtracts the power in the predetermined frequency band from the power for each frequency;
   a conversion unit that converts a subtraction result of the subtractor into a time signal;
   a second determination unit that determines that crushing of an unmelted resin raw material occurs in a case where the time signal converted by the conversion unit exceeds a second threshold; and
   a control unit that increases a set temperature of a heater to promote melting of the resin raw material when the second determination unit determines that crushing of an unmelted resin raw material occurs.

4. An abnormality detection device for an extrusion molding machine comprising:
   an acquisition unit that acquires a time signal of an elastic wave emitted according to the operating state of an extrusion molding machine that melts and kneads a fed resin raw material by an acoustic emission (AE) sensor installed on a surface of a housing of the extrusion molding machine;
   a calculation unit that calculates power for each frequency of the output of the AE sensor;
   a determination unit that determines that crushing of an unmelted resin raw material occurs in a case where power in a predetermined frequency band out of the power for each frequency calculated by the calculation unit exceeds a first threshold, and determines that wear of a screw that conveys the resin raw material from upstream to downstream, a barrel, or a kneading disk that kneads the resin raw material occurs in a case where power in a predetermined frequency band different from the predetermined frequency band out of the power for each frequency calculated by the calculation unit exceeds a second threshold; and
a control unit that reduces an amount of the resin to be fed or increases a set temperature of a heater to promote melting of the resin raw material when the determination unit determines that wear of a screw that conveys the resin raw material from upstream to downstream, a barrel, or a kneading disk that kneads the resin raw material occurs.

* * * * *